United States Patent
Peterkin et al.

(10) Patent No.: US 11,204,903 B2
(45) Date of Patent: Dec. 21, 2021

(54) DETERMINATION AND RECONCILIATION OF SOFTWARE USED BY A MANAGED NETWORK

(71) Applicant: ServiceNow, Inc., Santa Clara, CA (US)

(72) Inventors: Gavin Thomas Peterkin, Seattle, WA (US); Brian Eric Geihsler, Lake Forest Park, WA (US); Patrick Richard Lowndes, Seattle, WA (US); Peter John Bell, Seattle, WA (US)

(73) Assignee: ServiceNow, Inc., Santa Clara, CA (US)

( * ) Notice: Subject to any disclaimer, the term of this patent is extended or adjusted under 35 U.S.C. 154(b) by 297 days.

(21) Appl. No.: 16/402,025

(22) Filed: May 2, 2019

(65) Prior Publication Data

US 2020/0349134 A1 Nov. 5, 2020

(51) Int. Cl.
*G06F 3/048* (2013.01)
*G06F 16/22* (2019.01)
(Continued)

(52) U.S. Cl.
CPC ............ *G06F 16/22* (2019.01); *G06F 3/0482* (2013.01); *G06F 3/0483* (2013.01);
(Continued)

(58) Field of Classification Search
CPC ...... G06F 16/22; G06F 21/105; G06F 3/0482; G06F 3/0483; G06F 3/04847; G06F 8/65;
(Continued)

(56) References Cited

U.S. PATENT DOCUMENTS 6,321,229 B1 11/2001 Goldman
6,609,122 B1 8/2003 Ensor
(Continued)

OTHER PUBLICATIONS

Flexera, How to Avoid Overspending on Software, Mar. 3, 2017, Youtube,https://www.youtube.com/watch?v=FwUN_sn86fc&list=PLCuhlHqMRwWr-mLmBmi-kBQDRyCcnTI3p&index=3 (Year: 2017).*

(Continued)

*Primary Examiner* — Mohamed Abou El Seoud
(74) *Attorney, Agent, or Firm* — Fletcher Yoder PC

(57) ABSTRACT

A database may contain representations of: (i) software packages managed by a software management tool, including publishers, titles, and categories associated with each, and (ii) a plurality of software activities, including descriptions and amounts associated with each. A server device may be configured to obtain classifications of the software activities that predict the publishers, titles, and categories of the software activities from the descriptions. The server device may further compare the software packages to the classifications in order to identify: (i) unmanaged software packages, and (ii) amounts associated with the software packages. The server device may also transmit a representation of a graphical user interface that depicts first and second panes, the first pane listing the publishers with respective total publisher amounts and whether any of the unmanaged software packages are attributable to each of the publishers, and the second pane including a chart depicting the amounts incurred over time.

20 Claims, 24 Drawing Sheets

(51) Int. Cl.

| | |
|---|---|
| *G06N 20/00* | (2019.01) |
| *G06F 3/0482* | (2013.01) |
| *G06F 3/0483* | (2013.01) |
| *G06F 3/0484* | (2013.01) |
| *G06F 8/65* | (2018.01) |
| *G06Q 10/06* | (2012.01) |
| *G06F 21/10* | (2013.01) |

(52) U.S. Cl.
CPC ............ *G06F 3/04847* (2013.01); *G06F 8/65* (2013.01); *G06F 21/105* (2013.01); *G06N 20/00* (2019.01); *G06Q 10/0631* (2013.01); *G06F 21/10* (2013.01); *G06F 2203/04803* (2013.01); *G06Q 2220/18* (2013.01)

(58) Field of Classification Search
CPC .......... G06F 21/10; G06F 2203/04803; G06Q 10/0631; G06Q 2220/18; G06N 20/00; G06N 5/04; G06N 3/082; G06N 7/005; G06N 5/022; G06N 20/20; H04L 41/22; H04L 41/16; H04L 41/0213; H04L 41/0853; H04L 41/12; H04L 41/5058
See application file for complete search history.

(56) References Cited

U.S. PATENT DOCUMENTS

| | | | |
|---|---|---|---|
| 6,799,189 | B2 | 9/2004 | Huxoll |
| 6,816,898 | B1 | 11/2004 | Scarpelli |
| 6,829,604 | B1 | 12/2004 | Tifft |
| 6,895,586 | B1 | 5/2005 | Brasher |
| 7,020,706 | B2 | 3/2006 | Cates |
| 7,027,411 | B1 | 4/2006 | Pulsipher |
| 7,028,301 | B2 | 4/2006 | Ding |
| 7,062,683 | B2 | 6/2006 | Warpenburg |
| 7,131,037 | B1 | 10/2006 | LeFaive |
| 7,170,864 | B2 | 1/2007 | Matharu |
| 7,350,209 | B2 | 3/2008 | Shum |
| 7,392,300 | B2 | 6/2008 | Anantharangachar |
| 7,610,512 | B2 | 10/2009 | Gerber |
| 7,617,073 | B2 | 11/2009 | Trinon |
| 7,627,617 | B2 | 12/2009 | Kavuri et al. |
| 7,685,167 | B2 | 3/2010 | Mueller |
| 7,689,628 | B2 | 3/2010 | Garg |
| 7,716,353 | B2 | 5/2010 | Golovinsky |
| 7,769,718 | B2 | 8/2010 | Murley |
| 7,783,744 | B2 | 8/2010 | Garg |
| 7,890,802 | B2 | 2/2011 | Gerber |
| 7,895,563 | B2 | 2/2011 | Carlson et al. |
| 7,925,981 | B2 | 4/2011 | Pourheidar |
| 7,930,396 | B2 | 4/2011 | Trinon |
| 7,933,927 | B2 | 4/2011 | Dee |
| 7,945,860 | B2 | 5/2011 | Vambenepe |
| 7,966,398 | B2 | 6/2011 | Wiles |
| 8,051,164 | B2 | 11/2011 | Peuter |
| 8,082,222 | B2 | 12/2011 | Rangarajan |
| 8,151,261 | B2 | 4/2012 | Sirota |
| 8,224,683 | B2 | 7/2012 | Manos |
| 8,266,096 | B2 | 9/2012 | Navarrete |
| 8,380,645 | B2 | 2/2013 | Kowalski |
| 8,402,127 | B2 | 3/2013 | Solin |
| 8,457,928 | B2 | 6/2013 | Dang |
| 8,478,569 | B2 | 7/2013 | Scarpelli |
| 8,554,750 | B2 | 10/2013 | Rangaranjan |
| 8,612,408 | B2 | 12/2013 | Trinon |
| 8,626,769 | B1* | 1/2014 | Bhatt ................ G06Q 40/12 707/740 |
| 8,646,093 | B2 | 2/2014 | Myers |
| 8,674,992 | B2 | 3/2014 | Poston |
| 8,743,121 | B2 | 6/2014 | De Peuter |
| 8,745,040 | B2 | 6/2014 | Kowalski |
| 8,812,539 | B2 | 8/2014 | Milousheff |
| 8,818,994 | B2 | 8/2014 | Kowalski |
| 8,832,652 | B2 | 9/2014 | Mueller |
| 8,887,133 | B2 | 11/2014 | Behnia |
| 9,015,188 | B2 | 4/2015 | Behne |
| 9,037,536 | B2 | 5/2015 | Vos |
| 9,065,783 | B2 | 6/2015 | Ding |
| 9,098,322 | B2 | 8/2015 | Apte |
| 9,122,552 | B2 | 9/2015 | Whitney |
| 9,137,115 | B2 | 9/2015 | Mayfield |
| 9,239,857 | B2 | 1/2016 | Trinon |
| 9,317,327 | B2 | 4/2016 | Apte |
| 9,323,801 | B2 | 4/2016 | Morozov |
| 9,363,252 | B2 | 6/2016 | Mueeler |
| 9,412,084 | B2 | 9/2016 | Kowalski |
| 9,467,344 | B2 | 10/2016 | Gere |
| 9,535,737 | B2 | 1/2017 | Joy |
| 9,613,070 | B2 | 4/2017 | Kumar |
| 9,645,833 | B2 | 5/2017 | Mueller |
| 9,654,473 | B2 | 5/2017 | Miller |
| 9,659,051 | B2 | 5/2017 | Hutchins |
| 9,766,935 | B2 | 9/2017 | Kelkar |
| 9,792,387 | B2 | 10/2017 | George |
| 9,805,322 | B2 | 10/2017 | Kelkar |
| 9,852,165 | B2 | 12/2017 | Morozov |
| 10,002,203 | B2 | 6/2018 | George |
| 2001/0042032 | A1 | 11/2001 | Crawshaw et al. |
| 2006/0111874 | A1* | 5/2006 | Curtis ................ G06Q 10/087 702/186 |
| 2011/0131134 | A1* | 6/2011 | Ferris ................ G06F 21/10 705/40 |
| 2012/0054166 | A1* | 3/2012 | Jeremias ................ G06F 16/58 707/706 |
| 2014/0059535 | A1 | 2/2014 | Gocek et al. |
| 2015/0134485 | A1 | 5/2015 | Kim et al. |
| 2017/0169249 | A1 | 6/2017 | de Oliveira et al. |
| 2018/0322599 | A1* | 11/2018 | Srivastava .......... H04L 41/0853 |

OTHER PUBLICATIONS

Flexera, SAP Named User and Indirect Access License Optimization, Mar. 3, 2017, https://www.youtube.com/watch?v=WLLrJD-K6aU&list=PLCuhlHqMRwWr-mLmBmi-kBQDRyCcnTI3p&index=8 (Year: 2017).*

Flexera, Data Analytics Gives You Visibility into Key Enterprise Data from Flexera, Mar. 3, 2017, https://www.youtube.com/watch?v=FyyDvoWq8aI&list=PLCuhlHqMRwWr-mLmBmikBQDRyCcnTI3p&index=4 (Year: 2017).*

Flexera, Introduction to FlexNet Manager Suite for Enterprises, Mar. 3, 2017, https://www.youtube.com/watch?v=cLMH4js406g&list=PLCuhlHqMRwWr-mLmBmi-kBQDRyCcnTI3p&index=1 (Year: 2017).*

ServiceNow Documentation, Set Up OAuth, printed from https://docs.servicenow.com, Oct. 22, 2018.

International Search Report and Written Opinion for PCT Application No. PCT/US2020/031162 dated Jul. 31, 2020; 12 pgs.

* cited by examiner

| 612 → | ID | 620 → EXPENSE ACCOUNT | 630 → PROVIDER NAME | 640 → DESCRIPTION | 650 → ACTUALLY SOFTWARE | 660 → ACTUAL PROVIDER | 670 → ACTUAL APPLICATION TITLE |
|---|---|---|---|---|---|---|---|
| | 1 | Subscription software licenses | MICROCORP RENEWALS | MC Appl Title 1 renewal | TRUE | MICROCORP | MC Application Title 1 |
| | 2 | Travel expenses | RIDESHARE INC | Transportation to MICROCORP office | FALSE | | |
| | 3 | Software | SOFTWARE SYSTEMS | Office productivity tool | TRUE | SOFTWARE SYSTEMS | |
| | 4 | Other | SFTWR SYSTMS | Travel Survey facility for team feedback | TRUE | SOFTWARE SYSTEMS | SOFTWARE SYSTEMS Survey |
| | 5 | Software | FONTS, INC | Font purchase | FALSE | | |

| Software Spend Transactions | | 1120 → 🔍 Search | | | | | |
|---|---|---|---|---|---|---|---|
| ☐ | Date | Description | Amount | Publisher | Product | Type | Department |
| ☐ | 2019-02-01 | Wordwriter annual subscription | $46,000.00 | Wordwriter, Inc | Wordwriter | Accounts Payable | Publishing |
| ☐ | 2019-03-07 | Chatbox sub | $3546.00 | Chats-r-Us | Chatbox | Expense | IT |
| ☐ | 2019-04-10 | Chatbox sub | $3546.00 | Chats-r-Us | Chatbox | Expense | IT |
| ☐ | 2019-01-22 | PhotoEditor Professional | $14,000.00 | ABC Software | PhotoEditor | Accounts Payable | Publishing |
| ☐ | 2019-03-23 | SocialNet Premium fee | $87.00 | SocialNet | N/A | Expense | HR |
| ☐ | 2019-02-22 | Zdrive storage | $8000.00 | Zeta Corp. | Drive | Accounts Payable | Video Production |

▶ Actions on selected rows

[6] rows per page  ▽ [1] of 34 △

FIG. 11

DETERMINATION AND RECONCILIATION OF SOFTWARE USED BY A MANAGED NETWORK

BACKGROUND

Medium and large enterprises deploy numerous software packages throughout their networks and may use other software packages that are accessible by way of third-party or cloud-based providers. In some cases, hundreds or thousands of these packages can be installed on various types of computing devices. Frequently, information technology (IT) professionals within the enterprise do not have a clear picture of the software packages deployed or used, much less whether these packages are properly licensed or overlap in functionality. As a result, enterprises can waste a great deal of effort attempting to understand and optimize their software assets, but still fall short of this goal.

SUMMARY

In order to actively manage software usage, licenses and/or subscriptions, enterprises may make use of software asset management tools. These tools may include or use a discovery facility to automatically find deployed software by probing computing devices on an enterprise's network, as well as a license manager to store entitlements to this software (e.g., units of licenses purchased or otherwise obtained by the enterprise). A further reconciliation tool may compare the discovered software to the entitlements in order to identify situations where software packages are under-licensed (thus putting the enterprise at risk of legal liability) or over-licensed (thus putting the enterprise at risk of wasting money on unnecessary licenses).

But an automated discovery tool may not be able to detect all installed software packages, especially when computing devices join and leave the network periodically (e.g., laptop and mobile devices) or when the software in question is not installed in the enterprise and is instead accessed as an application hosted in the cloud (e.g., on a remote third-party network). Thus, automated discovery procedures can be limited in scope and accuracy, at least in terms of the ability to discover some types of software.

The present embodiments describe techniques through which documentation regarding the licensing of software packages can be analyzed to determine software that is or may be deployed on a network or hosted by a cloud-based provider. Using machine learning, a publisher (e.g., vendor) name and product (application title) of a software package can be determined from journal entry, a transaction description, an invoice, a bill, a manifest, or other expenditure record (e.g., a receipt or credit card statement). This allows discovery of software packages and entitlements thereto that might not be easily discovered otherwise.

Software packages identified in this fashion are compared to those being actively managed through a software asset management tool. Graphical user interfaces (GUIs) may indicate unmanaged packages, the amount spent on packages, how the packages were obtained (e.g., through invoicing or individual purchases), and/or cost center, department, or location in which these packages were purchased or deployed. Further GUIs may indicate the amounts spent on and numbers of software packages with overlapping functionality. For example, various groups within enterprises may unknowingly purchase redundant copies of the same software package, or may be using multiple software packages that have the same purpose.

As a result of the embodiments described herein, IT professionals, procurement professionals, and/or other users can quickly identify and address inefficiencies in their software utilization and licensing.

Accordingly, a first example embodiment may involve a database containing representations of: (i) a plurality of software packages managed by way of a software management tool, including publishers, titles, and categories associated with each of the software packages, and (ii) a plurality of software activities (e.g., transactions), including descriptions and amounts associated with each of the software activities. The first example embodiment may also involve a server device. The server device may be configured to obtain machine-learning-based classifications of the software activities, where the machine-learning-based classifications predict the publishers, titles, and categories of the software activities from the descriptions. The server device may be further configured to compare the plurality of software packages to the machine-learning-based classifications in order to identify: (i) unmanaged software packages that are not managed by way of the software management tool, and (ii) amounts associated with at least some of the software packages. The server device may be further configured to transmit, to a client device, a representation of a graphical user interface, where the graphical user interface depicts a first pane and a second pane, where the first pane includes an expandable listing of the publishers with respective total publisher amounts associated with the software packages attributable to each of the publishers and whether any of the unmanaged software packages are attributable to each of the publishers, and where the second pane includes a chart visually depicting the amounts incurred over units of a pre-determined period of time.

A second example embodiment may involve obtaining, by a server device and from a database, representations of: (i) a plurality of software packages managed by way of a software management tool, including publishers, titles, and categories associated with each of the software packages, and (ii) a plurality of software activities, including descriptions and amounts associated with each of the software activities. The second example embodiment may also involve obtaining, by the server device, machine-learning-based classifications of the software activities, where the machine-learning-based classifications predict the publishers, titles, and categories of the software activities from the descriptions. The second example embodiment may also involve comparing, by the server device, the plurality of software packages to the machine-learning-based classifications in order to identify: (i) unmanaged software packages that are not managed by way of the software management tool, and (ii) amounts associated with at least some of the software packages. The second example embodiment may also involve transmitting, by the server device and to a client device, a representation of a graphical user interface, where the graphical user interface depicts a first pane and a second pane, where the first pane includes an expandable listing of the publishers with respective total publisher amounts associated with the software packages attributable to each of the publishers and whether any of the unmanaged software packages are attributable to each of the publishers, and where the second pane includes a chart visually depicting the amounts incurred over units of a pre-determined period of time.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6B illustrates a set of labeled activity records, in accordance with example embodiments.

FIG. 11 depicts a graphical user interface listing software transactions, in accordance with example embodiments.

DETAILED DESCRIPTION

Figure 1:
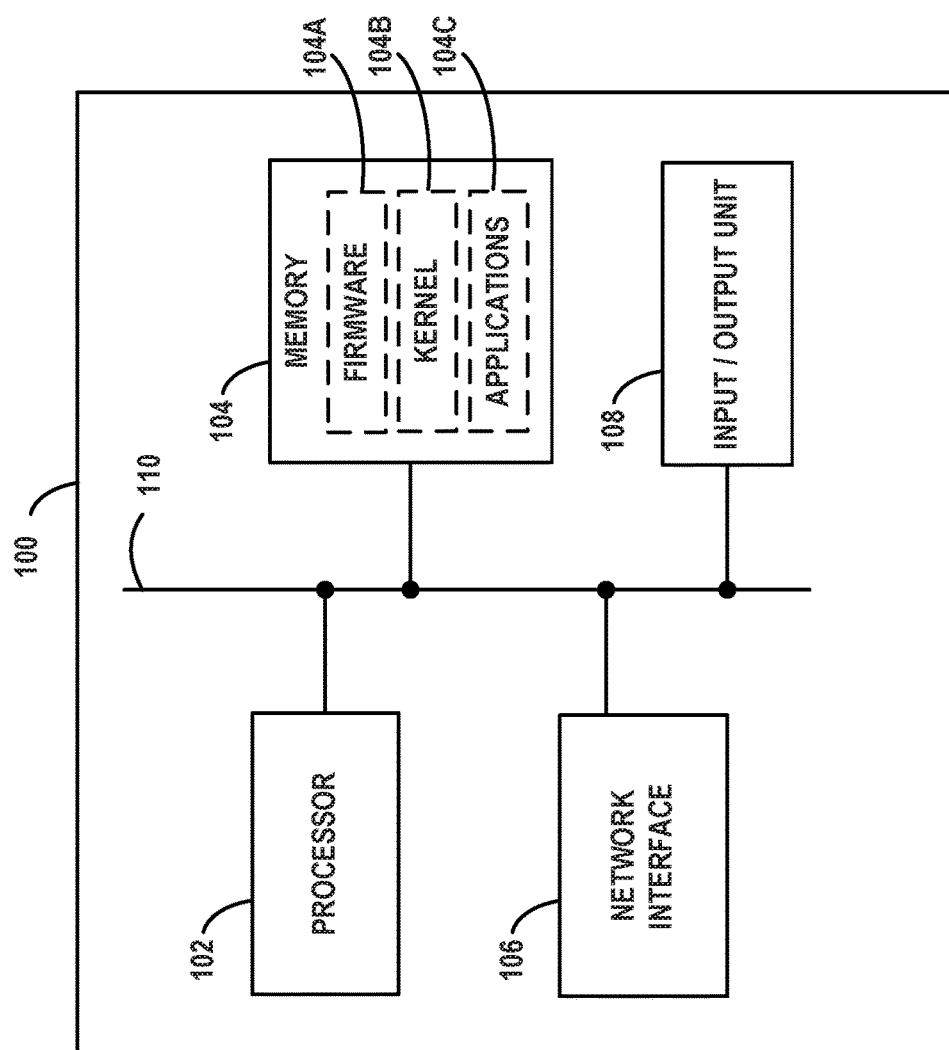
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these operations are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
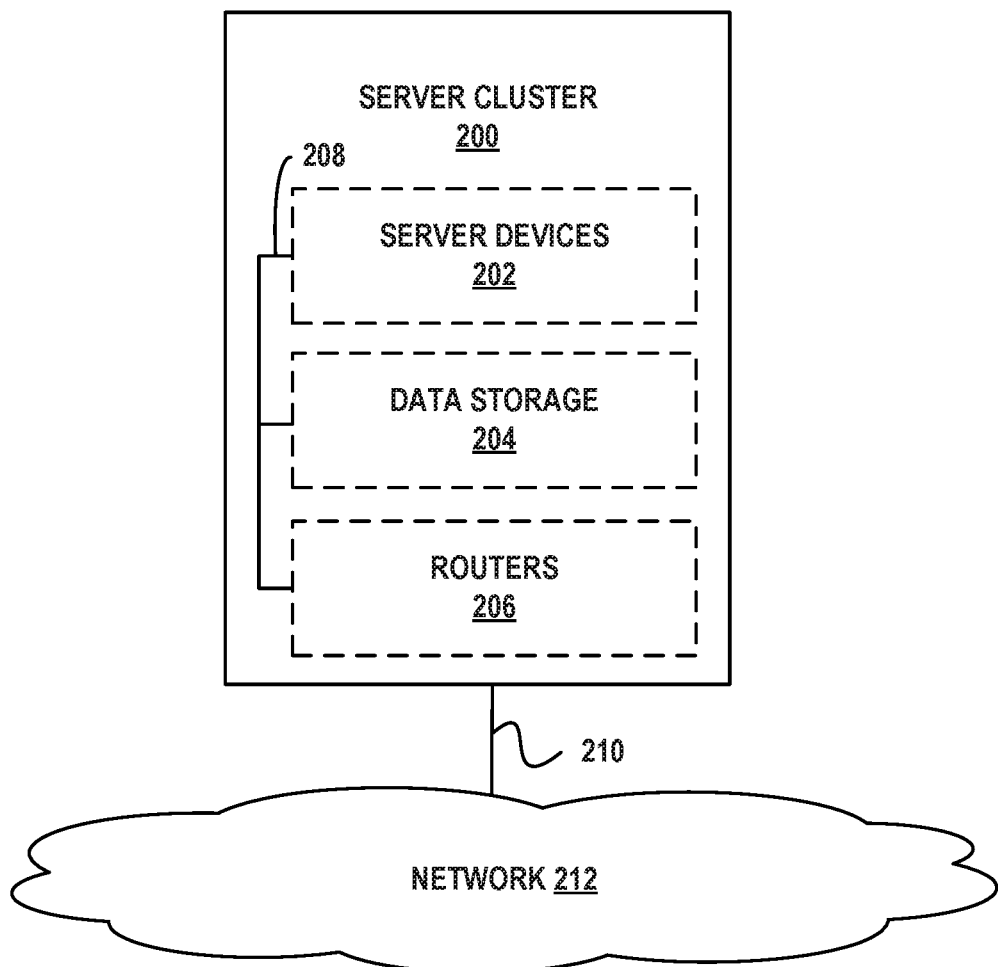
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
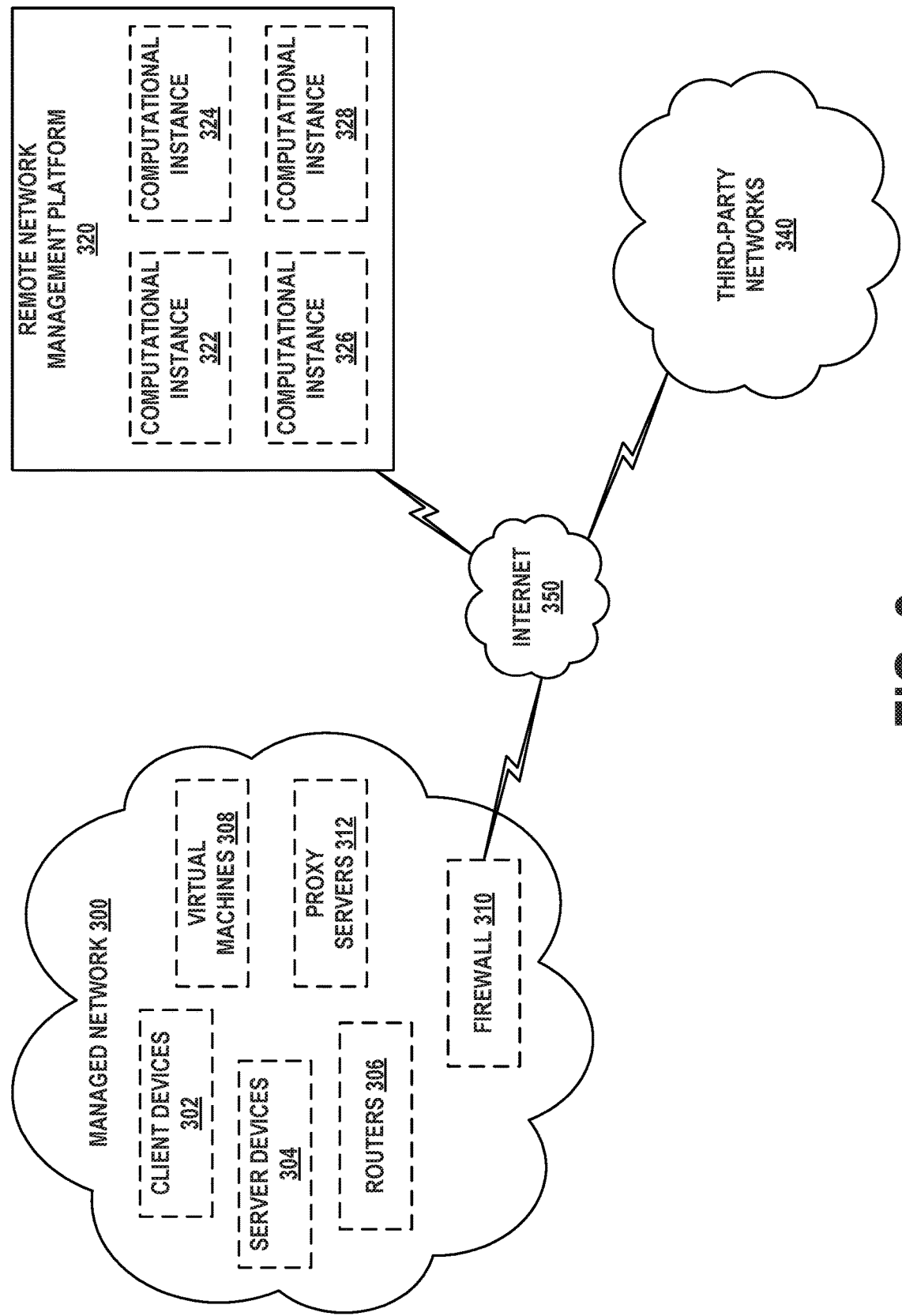
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
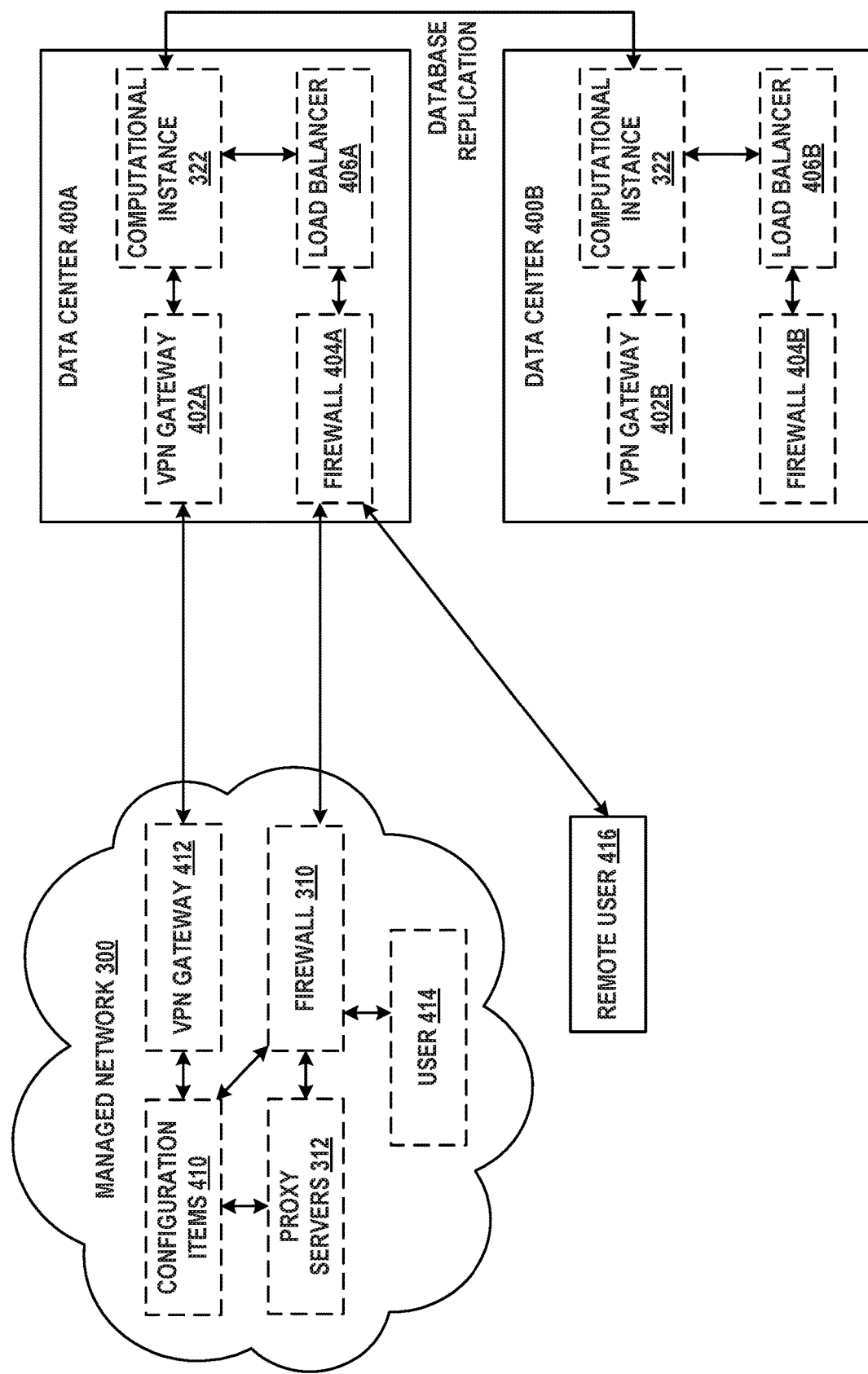
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
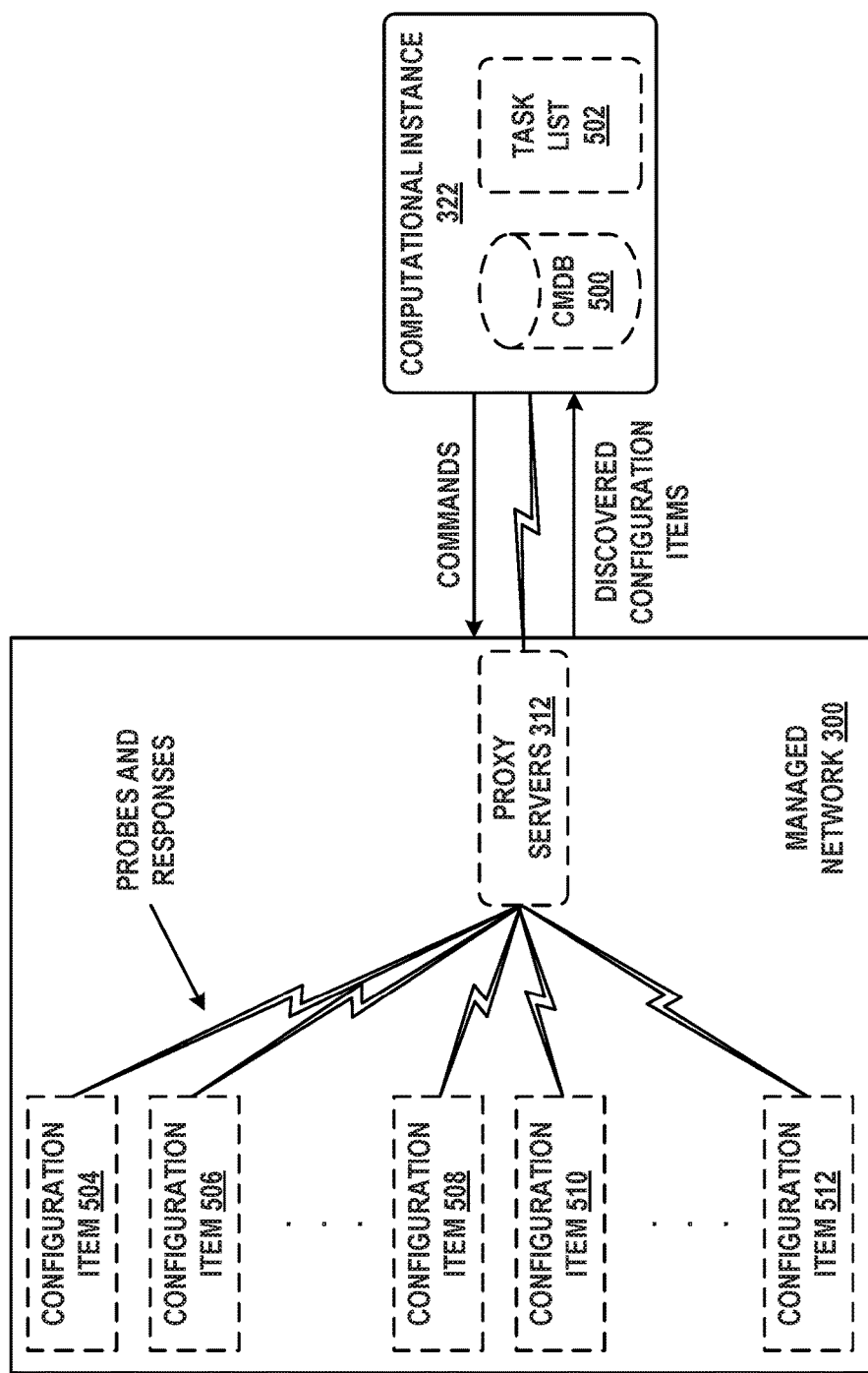
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
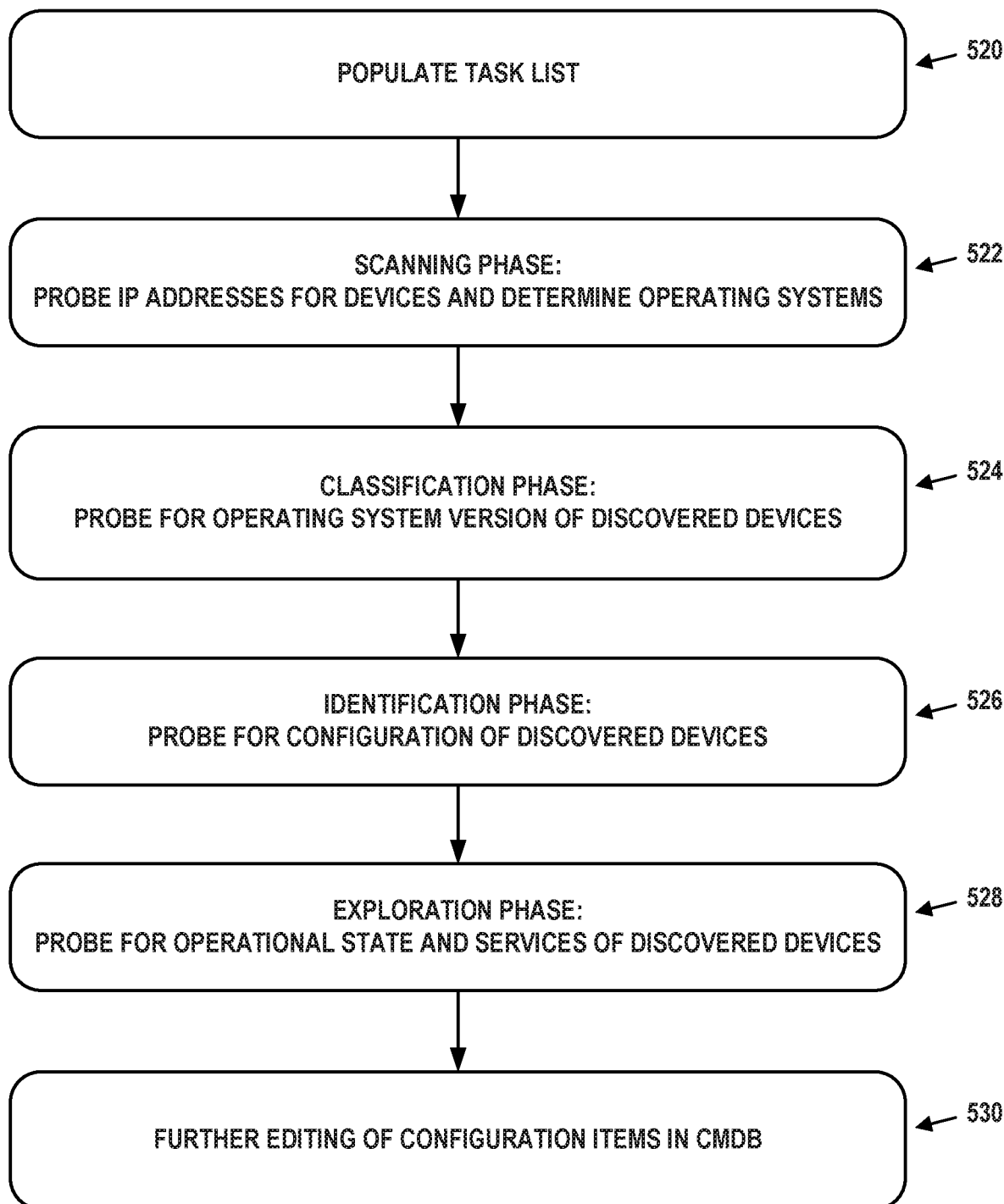
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. DISCOVERY OF SOFTWARE TRANSACTIONS FROM ACTIVITY RECORDS

Transactions involving the purchase or licensing of applications and services may be recorded in activity records. These activity records may contain data from representations of receipts, licensing agreements, or expense reports, for example. By analyzing activity records in accordance with the embodiments herein, transactions related to software may be discovered and classified.

In particular, the presently described automated system classifies activity records as either being related to software or not being related to software. An activity record classified as related to software may be further analyzed to determine the provider of the software (e.g., a software company that manufactures or distributes the software, or a service provider that provides a software service). If the provider is determined, the activity record may be further analyzed to determine the application title of the software. The embodiments herein advantageously utilize a multi-level machine learning (ML) model to perform each of these analyses and may be able to do so with better accuracy than conventional methods.

A. Software Catalog

Figure 6A:
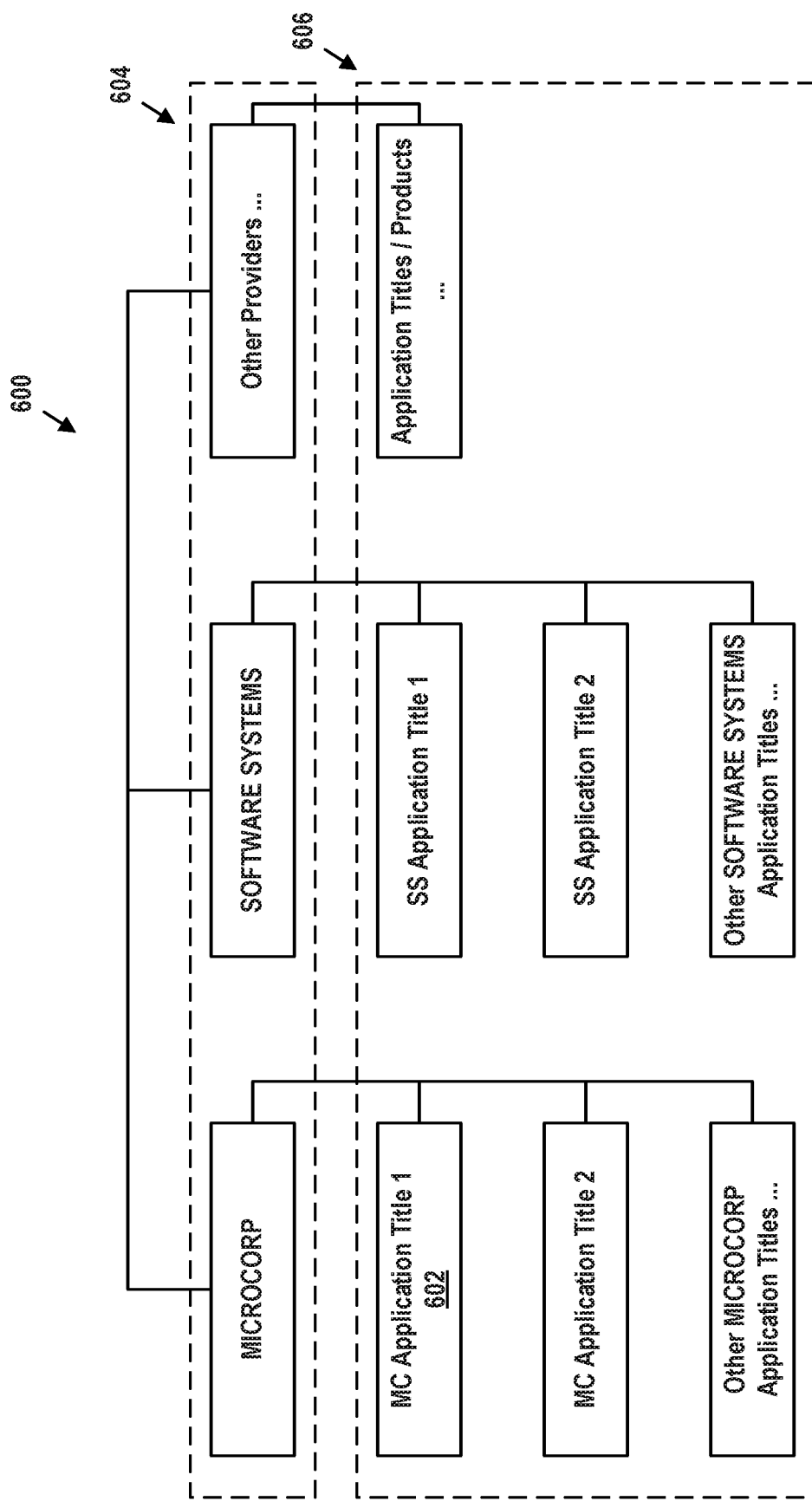
FIG. 6A illustrates a software catalog, in accordance with example embodiments.

The multi-layer ML model can access a software catalog and/or a software catalog vocabulary derived from the catalog. FIG. 6A illustrates software catalog 600, in accordance with example embodiments. Software catalog 600 could include a plurality of entries, each of which could relate to a specific software title and/or version. That is, each entry could include a provider, an application title and/or a version. For example, an entry in software catalog 600 could include a plurality of application titles and their corresponding providers. In some cases, the software catalog may include uniform resource locators (URLs) or domain names of providers and/or their application titles. For example, entry 602 in FIG. 6A for "MC Application Title 1" could be associated with provider MICROCORP.

In some embodiments, software catalog 600 could include, for example, 1,000 entries, 10,000 entries, 100,000 entries or more. Each entry of software catalog 600 could relate to past, present, or even future pre-release versions of software products and related services. In some embodiments, software catalog 600 could be implemented as a file and/or a database.

As illustrated in FIG. 6A, software catalog 600 could have an implicit or explicit a tree structure. For example, each provider 604 could represent branches of the tree and each product or application title 606 could represent leaves on the branches. Software catalog 600 could be maintained (e.g., updated and adjusted) automatically (e.g., updates may be retrieved from a remote server) or manually.

When application titles are updated or revised, the old version of the application titles could remain in software catalog 600. In case of an acquisition or merger of a provider, the corresponding application title could be migrated to a new provider. However, the tree history is preserved (e.g., the tree structure is generally not pruned) so it can still be used to aid in classification—especially of older applications relating to legacy products.

In some embodiments, software catalog 600 could be parsed to form the software catalog vocabulary. For example, software catalog 600 could be parsed for use in conjunction with a "bag-of-words" model. That is, each individual word in software catalog 600 could be identified with a word count (e.g., the number of times the word appears in software catalog 600) and/or a word frequency (e.g., the frequency at which the word appears in software catalog 600). Accordingly, the bag-of-words model may provide a software catalog vocabulary that is represented by an orderless document of unique words each having a word count and/or word frequency. In some cases, the parsing process may ignore capitalization, spaces, special characters, and/or other formatting information.

In accordance with the bag-of-words model, "MC Application Title 1" could be represented as: {"MICROCORP", "Application", "Title", and "1"}. In such a scenario, the contraction "MC" could be expanded to "MICROCORP." Other text normalization processes to provide a plurality of unique words from each entry are possible. A word count and/or word frequency could be associated with each unique word based on how many times the word appears in the software catalog 600. It will be understood that other ways to represent the software catalog vocabulary are possible.

Additionally or alternatively, the software catalog vocabulary could be stored as an n-gram model that associates spatial information with parsed words of the software catalog. For example, a bigram model could parse the text of the software catalog 600 into two-word units and store those as well as storing individual words and their discrete word counts/frequencies. As an example, for the entry "MC Application Title 1," the bigram model could include two-word units such as {"MICROCORP Application", "Application Title", and "Title 1"} as well as the single-word units similar to the bag-of-words representation. Other n-gram models (e.g., where n is equal to 3, 4, or more) are possible. Additionally, other parsing models such as dependency parsing and/or constituency parsing are also possible.

B. Training Data Set/Labeled Data

A training data set could be used to train one or more layers of the multi-layer ML model. The training data set could include a plurality of actual and/or hypothetical activity records that have been labeled. In some embodiments, each activity record could include at least four fields: (i) activity data, (ii) provider data, (iii) description data, and (iv) one or more labels.

The activity data field of a given activity record could include information about an expense type or a transaction type. For example, the activity data field could include "software", "travel", "personal", or "other", etc. In some cases, the activity data field could be manually entered (e.g., manually keyed). Accordingly, the activity data field could include a wide variety of entries.

The provider data field of a given activity record could include information about a potential vendor name. In some examples, the provider data field could include text information such as "MICROCORP", "SOFTWARE SYSTEMS", "SFTWR SYS", etc. A wide variety of entries could also be possible in the provider data field.

The description data field of a given activity record could include a brief description of the transaction. As an example, the description data field could include text entries such as "Office productivity tool", "Font purchase for MICROCORP", or "Transportation to MICROCORP office". Other examples are possible.

The label field could include one or more labels that indicate the "ground truth" with respect to whether the activity record relates to: (i) software, (ii) a particular provider (e.g., a software publisher or company), and/or (iii) a particular application title and/or version thereof. As an example, the label field could include "SOFTWARE", "MICROCORP", "MC Application Title 1", etc.

FIG. 6B illustrates a set of labeled activity records 610, in accordance with example embodiments. Each activity record could include an identifier (ID) 612, an expense account field 620, a provider name field 630, a description field 640, and one or more label fields 650, 660, and/or 670. Other types and/or formats of activity records 610 are possible.

The identifier 612 could include a transaction number, an expense report identifier, or another type of unique identifier such as date, time, submitter name, etc. The expense account field 620 could include information about the type of transaction (e.g., travel, software, computer, parking, mileage, etc.). In some embodiments, the expense account field 620 could include other types of activity data. The provider name field 630 could include information about a party to a transaction (e.g., the payee). In some embodiments, the provider name field 630 could include a seller or a contractor. The description field 640 could include information indicative of details about the transaction or activity record. For example, the description field 640 could include several words that briefly describe the purpose of the transaction or activity record.

In an example embodiment, the labeled activity records 610 could represent example entries of a labeled data set that could be used for training one or more layers of the multi-layer ML model. In such scenarios, the actually software field 650, actual provider field 660, and actual application title field 670 could include labeled data indicating the "ground truth" about a given transaction or activity record. These ground truth values may be manually entered or automatically determined.

As illustrated in FIG. 6B, Activity Record #1 could include the text "Subscription software licenses" in expense account field 620, "MICROCORP RENEWALS" in provider name field 630, and "MC Appl Title 1 renewal" in description field 640. According to actually software field 650, Activity Record #1 relates to software, according to actual provider field 660, the actual provider is "MICROCORP", and according to actual application title field 670, the actual application title is "MC Application Title 1".

Activity Record #2 could include the text "Travel expenses" in expense account field 620, "RIDESHARE INC" in provider name field 630, and "Transportation to MICROCORP office" in description field 640. According to actually software field 650, Activity Record #2 does not relate to software (e.g., even if MICROCORP is a software provider, this activity record relates to travel to this company's office, not a software purchase). In this case, the provider and application title are not relevant and need not appear in the labels.

Activity Record #3 could include the text "Software" in expense account field 620, "SOFTWARE SYSTEMS" in provider name field 630, and "Office productivity tool" in description field 640. According to actually software field 650, Activity Record #3 relates to software, and according to actual provider field 660, the actual provider is "SOFTWARE SYSTEMS". However, the labeled data does not include an entry for actual application title field 670. For instance, the "Office productivity tool" in description field 640 may be too vague to determine a proper label. Nonetheless, Activity Record #3 may still be useful in training some components of the multi-layer ML model.

Activity Record #4 could include the text "Other" in expense account field 620, "SFTWR SYSTMS" in provider name field 630, and "Travel Survey facility for team feedback" in description field 640. According to actually software field 650, Activity Record #4 relates to software, according to actual provider field 660, the actual provider is "SOFTWARE SYSTEMS", and according to actual application title field 670, the actual application title is "SOFTWARE SYSTEMS Survey".

Activity Record #5 could include the text "Software" in expense account field 620, "FONTS, INC" in provider name field 630, and "Font purchase" in description field 640. According to actually software field 650, Activity Record #5 does not relate to software (e.g., a font purchase might not be considered a software purchase). In this case, the provider and application title are not relevant and need not appear in the labels.

C. First Layer of the ML Model—Identifying Software Transactions

The first layer of the multi-layer ML model utilizes a supervised stacked ensemble model to identify transactions that relate to software. The first layer accepts as input three text fields referred to as (i) activity data, (ii) provider data, and (iii) description data. In practice, the activity data field may be given content from an expense account field 620, the provider data field may be given content from a provider name field 630, and the description data field may be given content from a description field 640. Thus, input may be from an unlabeled expense report or some other type of unlabeled transaction or activity record. An initial step may be to determine whether this input relates to software.

Parsed data from each of activity data, provider data, and description data is input into respective ML classifiers (e.g., word embeddings or Naïve Bayes classifiers), which may have been trained with a labeled training data set (e.g., labeled activity records 610). As noted above, the labeled training data set includes actual or hypothetical activity records labeled as either being related to software or not related to software. As an example, the activity data might be considered important because the appearance of words or short sequences of words like "travel" or "food" or "posterboard for conference" in this field strongly increases the probability that this transaction is not related to software.

Based on their training, the respective ML classifiers could independently learn words and/or word sequences that correspond with either software or non-software transactions. Namely, each of the respective ML classifiers may output a likelihood that the words and/or phrases in the respective text fields relate to software.

As described herein, a word embedding based classifier may use a neural network to determine descriptors for words and/or paragraphs (e.g., groups of words adjacent or nearby to one another in a source document). These descriptors may map the words and/or paragraphs into an n-dimensional space (e.g., into word vectors or paragraph vectors) that represents the semantic meanings of the words and/or paragraphs.

As described herein, a Naïve Bayes classifier may be one or more types of probabilistic classifiers that apply Bayes' theorem. Furthermore, a Naïve Bayes classifier assumes that there is no dependence between multiple features. In some embodiments, due to their closed form, the Naïve Bayes classifier can provide improved speed and computational efficiency as compared to other classifier types and/or a neural network implementation. But other types of ML classifiers are possible.

In addition to these text-based classification models, the words and/or n-grams appearing in fields of the activity record can be compared to terms in the software catalog (e.g., software catalog 600) to find their intersection. The counts of words and/or n-grams appearing in both the activity record text and the software catalog are used as potential further indications that a particular activity record relates to software. For example, the prevalence of the word "MICROCORP" in an activity record and the software catalog may be indicative that the activity record is related to software.

Each of the three discrete likelihoods, one for each of the ML classifiers as well as the word count, are then aggregated (e.g., using a logistic regression) in a secondary classification model that factors in the relative importance of each field along with the certainty of each prediction. That is, the three discrete likelihoods and the word count are each treated as a feature in a logistic regression.

As described herein, the logistic regression can be an L2 logistic regression that includes a regularization term. The regularization term can be applied so as to "penalize" high coefficient values or weights. Such a regularization term can help improve fitting, prediction accuracy, and/or other aspects of the multi-layer ML model. In an example embodiment, the output of the L2 logistic regression could include a prediction of whether a given activity record is software or not, along with a likelihood or uncertainty value. Alternatively, the logistic regression can be replaced by or used with a Bayes optimal classifier. As described herein, a Bayes optimal classifier includes an ensemble classifier that collects a plurality of hypotheses in a hypothesis space. For example, a Bayes optimal classifier could be used in a stacked classification model to synthesis multiple discrete classifiers.

The result of this first layer process is a model that predicts the probability that any given activity relates to software. That is, if the first layer process returns a likelihood that is equal or greater than a software determination threshold (e.g., 50%), the activity record may be analyzed by the second layer of the multi-layer ML model. If the first layer process returns a low likelihood that the activity record relates to software (e.g., a likelihood below the software determination threshold), it could be considered safe to discard the given activity record without moving to the next layer. Generally, the multi-layer ML model permits these "dropouts" at any layer so as to conserve computing resources and improve activity record throughput.

In some embodiments, activity records that might possibly be software (e.g., within a 20-50% likelihood of being software) could be tagged for manual classification so as to avoid discarding legitimate software-related activity records as false negatives. In other embodiments, in an effort to avoid false classification of an activity record as not being related to software, the software determination threshold could be set very low (e.g., 20% likelihood or lower).

D. Second Layer of the ML Model—Provider Classification

Once a given activity record is classified as software, the multi-layer ML model can predict whether the activity record relates to a specific provider. Due to the large number of possible software providers and the difficulties associated with obtaining data for all of them, a fully supervised, multi-category model may not be feasible. Instead, in the present disclosure, the second layer of the multi-layer ML model applies an ordered collection of rules in an aggregated manner.

The provider data field and description data fields are tokenized by splitting text around white space and other potential delimiters (commas, tabs, carriage returns, etc.). The tokenized words may be then organized into a vector of single word tokens and a range of n-gram word combinations. In some embodiments, the n-gram word tokens may help to accommodate providers with multi-word names.

The ordered collection of rules is then applied to the vector of single and n-gram word tokens. Namely, each rule takes the vector and the software catalog and/or the software catalog vocabulary, performs a comparison, and returns a (dis)similarity score indicating how similar a particular vector is to items in the software catalog.

An example rule could perform a specific normalization operation on the provider field of the activity record and perform another specific normalization operation on a catalog item's provider name. Such a rule could determine if the provider name appears at the beginning of the provider field of the activity record. If so, the rule returns an indication of a match (e.g., a "1" or a Boolean "true" value), else the rule returns an indication of a non-match (e.g., a "0" or a Boolean "false" value). Another rule could determine if the provider name is an exact match of the provider field of the activity record. Yet another rule could determine if the provider name is contained within the provider field of the activity record. Still another rule could calculate the edit distance between the provider data field and the provider name and select the shortest such distance while adjusting for overall word length. Additional rules could also utilize more sophisticated techniques like using a word vector (word2vec) word embedding and taking the minimum cosine distance between words in the activity record and in the software catalog. Other rules may be possible.

In full generality, a rule (also referred to as a similarity function) can be any function that receives data from an activity record and returns a number or value indicating the degree of (dis)similarity to providers in the software catalog. The rules may be independent of the providers. The rules may follow an assumption that they are not collinear.

During a training phase, a logistic regression can be fit to a labeled dataset to determine how well each rule functions and how to best aggregate their predictions. Once trained, the second layer of the model accepts data from an activity record, performs the first rule, and checks the resulting probabilities. If the probability exceeds a threshold for a certain provider, the system exits with a prediction of the certain provider. If not, the second rule is checked, the third rule is checked, and so on until either a match is found or all rules are executed. The ordering of these rules may be arranged based on expected compute time and/or expected accuracy of each. For example, rules with a lower expected compute time and/or a higher expected accuracy may be placed earlier in the ordering of the rules. Some embodiments may apply rules that attempt to match the longest possible terms first and only later move on to rules that match shorter text strings.

In some embodiments, rules may be associated with respective weights (e.g., values between 0 and 1) that indicate the importance of each rule. Rules that are expected to produce more accurate results may be given higher weights. The second layer may be trained with a labeled dataset and apply a maximum likelihood estimator (MLE) to determine these weights.

E. Third Layer of the ML Model—Application Title Classification

Once an activity record has been associated with a given provider, the search space of application titles in the software catalog can be reduced to include only those application titles associated with the identified provider. That is, when a provider is identified, the scope of the software catalog and/or the corresponding software catalog vocabulary could be limited to entries that relate to the identified provider.

The third layer works similarly to the second layer. Thus, the third layer tokenizes the description field of the activity record and the description field of the software catalog, and applies an ordered collection of rules to this data. The rules may be similar to those used above for the second layer, and each rule may also be associated with a respective weight that was determined through training. The ordering of these rules may be arranged based on expected compute time and/or expected accuracy of each. Further, the third layer may also take into account situations where a given provider has only one application title, and return that title whenever the given provider is predicted.

Once an activity record is fully classified, data from the activity record may be stored as a configuration item in a CMDB. For instance, the provider name, application title, version, price, contract terms, etc. may be attributes of the configuration item.

In some embodiments, publisher and/or product classification can use the cosine similarity of n-gram (where n will be a range) term frequency—inverse document frequency (TF-IDF) vectors, where these vectors are fit independently to the catalog and the transactions to reflect their unique token frequency distributions. Word vectors or paragraph vectors could also be used in similarity. Since there are many potential dimensions where "rules" or similarity can be computed (e.g. "vendor name" from transaction and "name" of publisher or "description" and "name" from all potential products belonging to a particular publisher, etc.), a relatively small labeled dataset can be used to derive useful information about the efficacy of different similarity approaches and learn how to best aggregate them all via a maximum likelihood estimator. This could still involve logistic regression or softmax regression.

The TF-IDF cosine similarity implementation essentially amounts to a form of parameter sharing with TF-IDF serving as a prior for word weights. Eventually this parameter tying can be weakened with appropriate regularization to have the flexibility to pick up new tokens from newly labeled transactions and learn class-specific distributions by adjusting the TF-IDF "priors".

F. Experimental Model Results

During run-time experiments, the multi-layer ML model described herein has achieved over 94-98% precision in classifying both providers and application titles from unlabeled activity records. These results are competitive with or surpass manual labeling where only 90% of example activity records are correctly classified.

In some embodiments, the model could be utilized to tag new data (unlabeled activity records). In such scenarios, when low confidence predictions are made, such activity records may include software products not yet in the software catalog. Accordingly, the present embodiments could help inform how to update the software catalog and/or software catalog vocabulary.

VI. EXAMPLE MULTI-LAYER ML MODEL

Figure 7A:
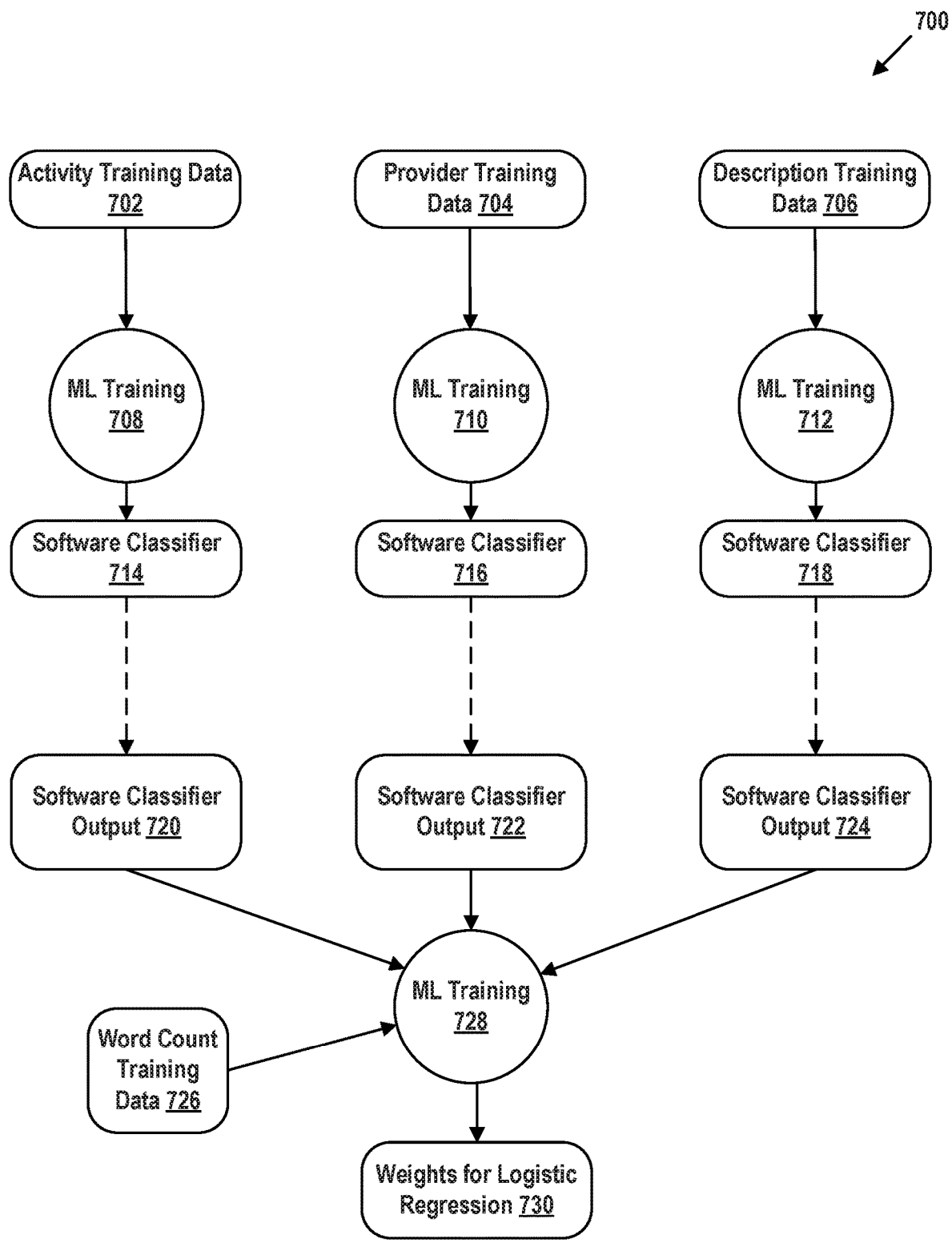
FIG. 7A illustrates a training phase of a first layer of a multi-layer machine learning model, in accordance with example embodiments.
Figure 7B:
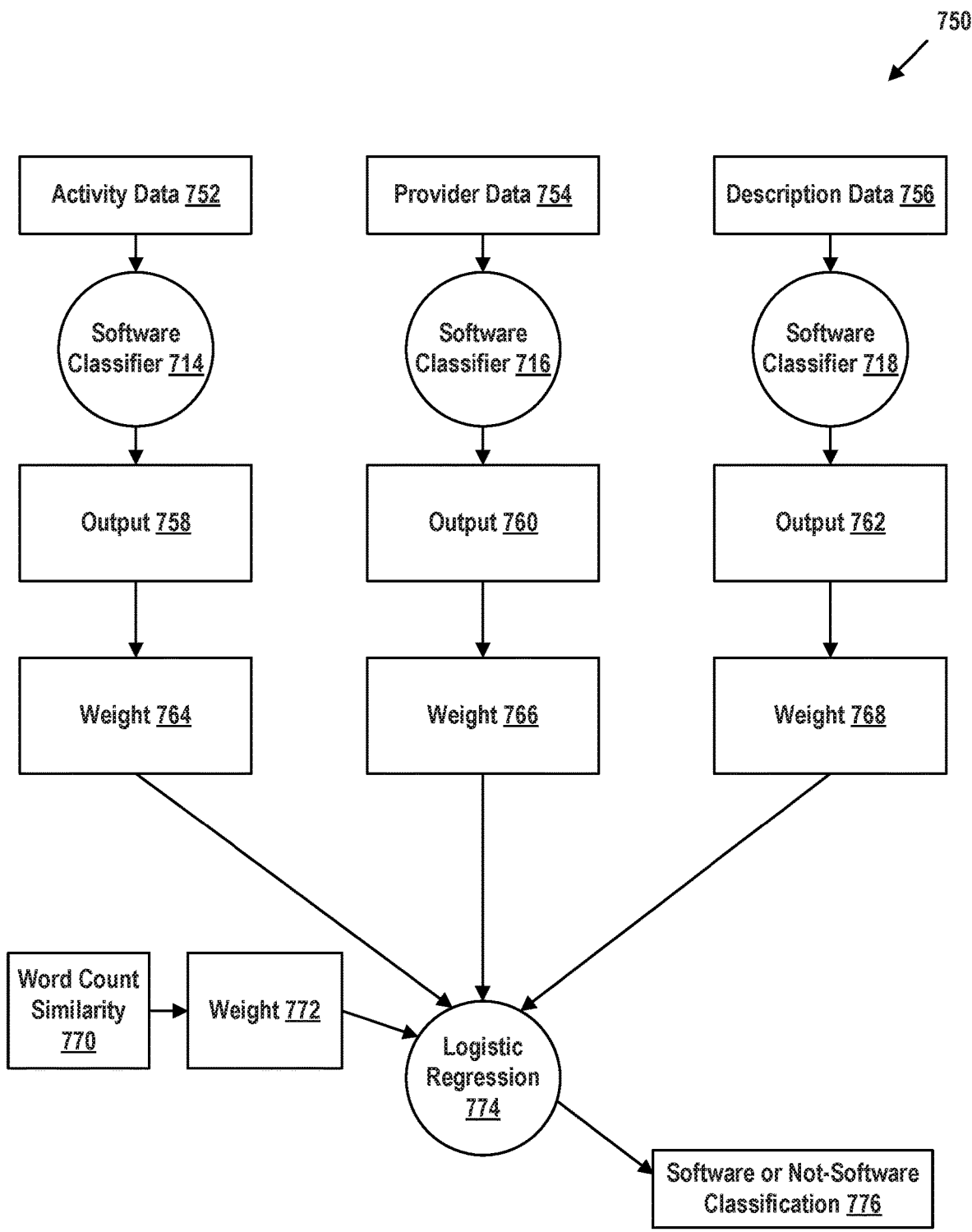
FIG. 7B illustrates a run-time phase of a first layer of a multi-layer machine learning model, in accordance with example embodiments.
Figure 8:
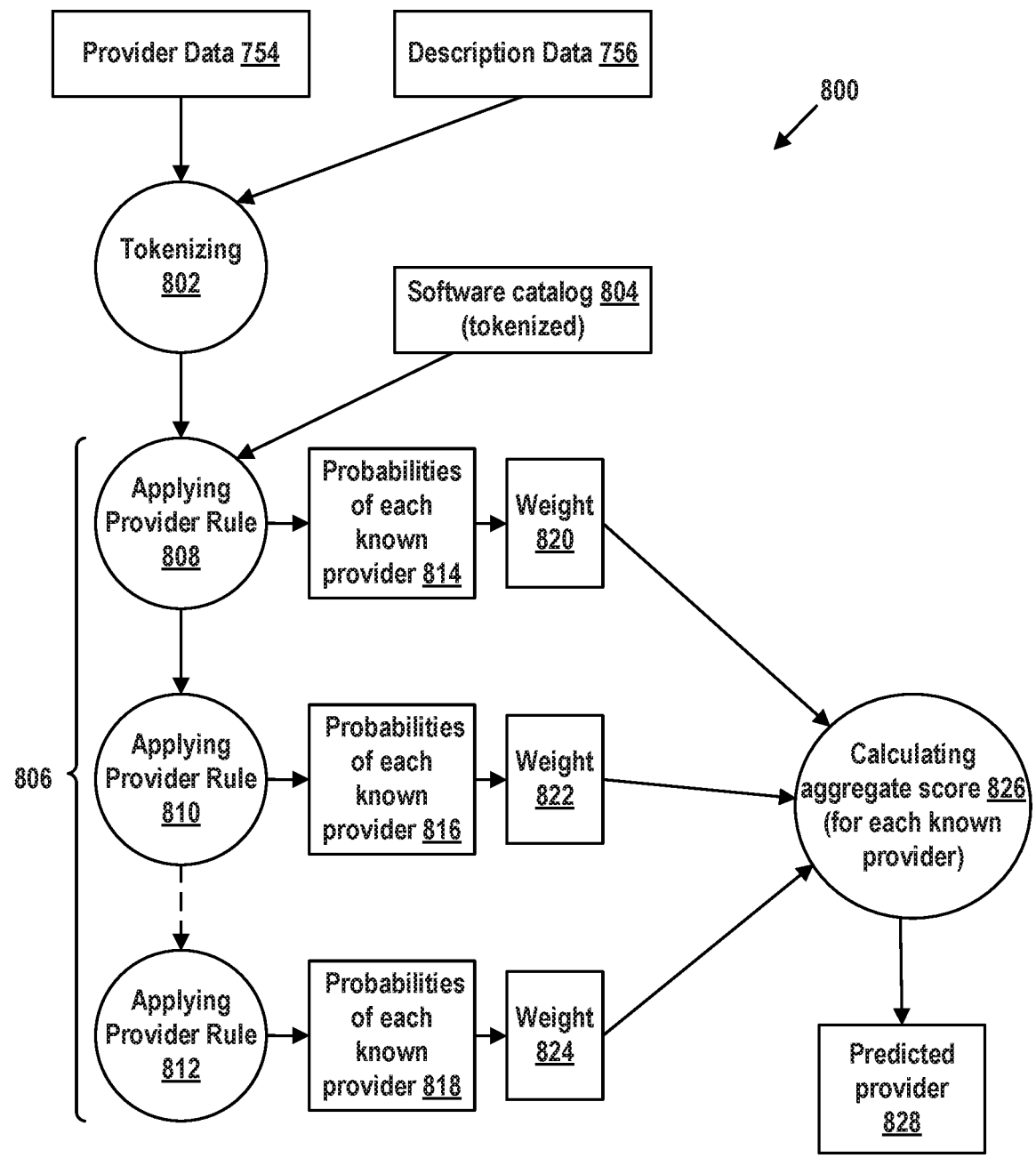
FIG. 8 illustrates a run-time phase of a second layer of a multi-layer machine learning model, in accordance with example embodiments.
Figure 9:
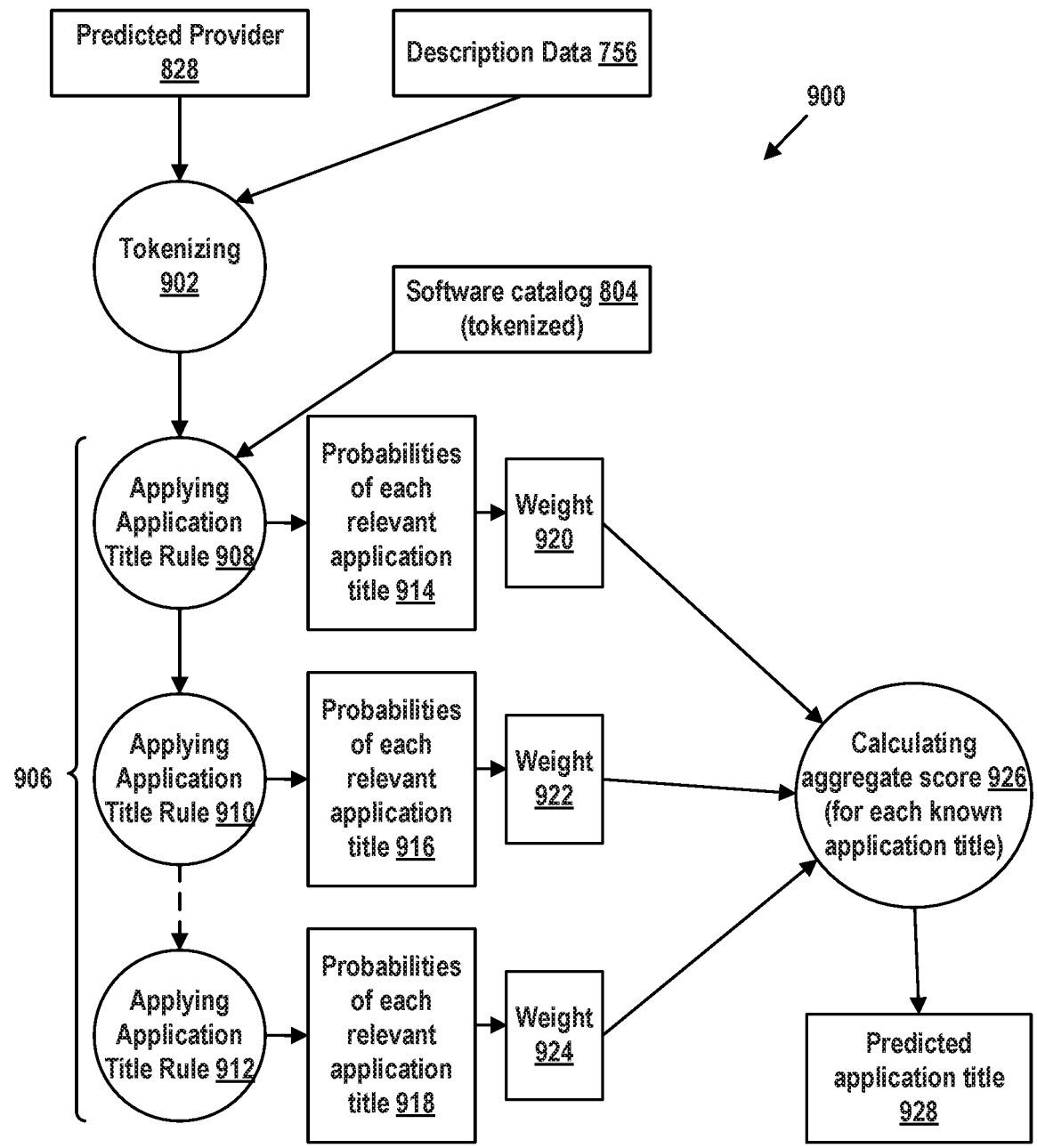
FIG. 9 illustrates a run-time phase of a third layer of a multi-layer machine learning model, in accordance with example embodiments.

FIGS. 7A, 7B, 8, and 9 illustrate three layers of a multi-layer ML model in more detail, according to example embodiments. Namely, FIG. 7A depicts training the first layer, FIG. 7B depicts operation of the first layer, FIG. 8 depicts operation of the second layer, and FIG. 9 depicts operation of the third layer. Any training of the second layer and third layer is optional and is described in the text herein.

As noted above, at least one layer of the multi-layer ML model could be trained during a training phase based on a labeled set of activity records. In such scenarios, each activity record could include, without limitation, activity data, provider data, description data, and one or more labels indicating ground truth values of whether the activity record is related to software, the provider name, and the application title. Labeled activity records 610 provide an example of this training data.

Aspects of the multi-layer ML model could be trained in a variety of different ways. For example, in some embodiments, one or more parameters of the constituent models could be estimated and adjusted using an MLE and/or maximum a posteriori (MAP) estimation. Other ways to train the parameters of the constituent models could include maximum spacing estimation, maximum entropy estimation, minimum distance estimation, and/or method of moments, among other various estimation methods.

In some embodiments, each of the models could utilize the same training data set. In other examples, each model could be provided its own unique training data set. Yet further, some training data entries could be set aside for use during one or more testing phases, which could be conducted subsequent to an initial training phase and/or between a number of training phases.

FIG. 7A depicts training the components of the first layer 700. Notably, ML training process 708 may take activity training data 702 from labeled activity records 610 as input and produce software classifier 714 as output. As an example, activity training data 702 may include data from fields 620 and 650 of labeled activity records 610. Software classifier 714 may be a naïve Bayesian classifier that returns a Boolean or numeric value predicting whether new observations of activity data are related to software.

ML training process 710 may take provider training data 704 from labeled activity records 610 as input and produce software classifier 716 as output. As an example, provider training data 704 may include data from fields 630 and 650 of labeled activity records 610. Software classifier 716 may also be a naïve Bayesian classifier that returns a Boolean or numeric value predicting whether new observations of provider data are related to software.

ML training process 712 may take description training data 706 from labeled activity records 610 as input and produce software classifier 718 as output. As an example, description training data 706 may include data from fields 640 and 650 of labeled activity records 610. Software classifier 718 may also be a naïve Bayesian classifier that returns a Boolean or numeric value predicting whether new observations of provider data are related to software.

ML training process 728 takes labeled output from each of software classifier 714, software classifier 716, and software classifier 718. Thus, as indicated by the respective dotted lines, software classifier output 720 is from software classifier 714, software classifier output 722 is from software classifier 716, and software classifier output 724 is from software classifier 718. The labeled output may include example output (either actual or synthetic) of each of software classifier 714, software classifier 716, and software classifier 718 as well as an indication of its ground truth accuracy (e.g., a prediction of whether a particular activity record relates to software and whether the particular activity record actually relates to software).

ML training process 728 also takes word count training data 726 and associated ground truth labels. Word count training data 726 may include predictions of whether a particular activity record relates to software based on common words and/or n-grams between the particular activity record and a software catalog. The ground truth labels may indicate whether the particular activity record actually relates to software.

ML training process 728 produces weights for logistic regression 730, where the logistic regression is applied to outputs from software classifier 714, software classifier 716, software classifier 718, and a word count procedure (see FIG. 7B for detail). Note that each of ML training 708, ML training 710, ML training 712, and ML training 728 may occur independently of one another.

FIG. 7B depicts the first layer of the ML model in operation 750. Activity data 752, provider data 754, and description data 756 may be from a new activity record (here, the term "new" means that the activity record was either generated after the first layer was trained, or that the activity record may not have been used to train the first layer).

This data is provided to software classifier 714, software classifier 716, and software classifier 718, respectively, each of which may have been trained in accordance with the discussion above. These classifiers produce output 758, output 760, and output 762, respectively. These outputs may be predictions of whether the activity record is related to software, and may take numeric or Boolean form, for example. Also, as discussed above, word count similarity 770 between one or more of (i) activity data 752, provider data, 754, and description data 756, and (ii) the software catalog may be determined. In general, software classifier 714, software classifier 716, software classifier 718, and word count similarity 770 may be considered to be similarity functions that predict whether activity data 752, provider data, 754, and description data 756 are consistent with a software transaction.

These outputs are respectively modified by weights 764, 766, 768, and 772. Thus, weight 764 may be applied to output 758, weight 766 may be applied to output 760, weight 768 may be applied to output 762, and weight 772 may be applied to word count similarity 770. These weights may have been determined during ML training 728, for example.

The modified outputs are provided to logistic regression 774, which produces an aggregate "software or not-software" classification 776. Logistic regression 774 may be an L2 logistic regression, for example.

In the case that logistic regression 774 classifies the activity record as related to software, the process continues to the second layer of the ML model. If logistic regression 774 classifies the activity record as not being related to software, the classification procedure for the activity record may end.

FIG. 8 depicts the second layer of the multi-layer ML model in operation 800. The second layer takes provider data 754 and description data 756 as input. In some embodiments, this may be the same data used as input to the first layer in operation 750. In some cases, description data 756 may be omitted and only provider data 754 is used.

Tokenizing 802 may take provider data 754 and description data 756 as input and produce tokened output consisting of one or more tokens associated with words and/or n-grams therein. Other processing, adjustment, or edits may be made to provider data 754 and description data 756. Also, it is assumed that software catalog 804 has already been tokenized (and/or processed, adjusted, or edited) so that it is in condition to be compared to the output of tokenizing 802.

A number of rules may be then applied to this data in rule order 806. For example applying provider rule 808 may take the output of tokenizing 802 and at least part of software catalog 804 as input, and produce respective probabilities for each known provider 814 as output. Likewise, applying provider rule 810 may take the output of tokenizing 802 and at least part of software catalog 804 as input, and produce respective probabilities for each known provider 816 as output. Similarly, applying provider rule 812 may take the output of tokenizing 802 and at least part of software catalog 804 as input, and produce respective probabilities for each known provider 818 as output. The dotted line between provider rule 810 and provider rule 812 indicates that rule order 806 may contain any number of rules.

As noted above, rules may be based on exact matches, partial matches, prefix matches, suffix matches, edit distances or other similarity functions between the tokenized input data and software catalog 804. Other types of rules are possible.

Thus, if there are 10 known providers in software catalog 804, a rule may generate a probability between 0 and 1 inclusive for each of these providers, where the higher the probability the better the match between the tokenized input data and software catalog 804. For example, if a rule is based on an exact match, it may generate a probability of 1 when it finds an exact match and a probability of 0 in all other cases. On the other hand, if a rule is based on an edit distance, it may generate a probability that is inversely proportional to the determined edit distance.

Rule order 806 may be arranged so that the rules with greater accuracy (e.g., as indicated by the weights) and/or lower computational requirements may be applied first. If any rule generates a probability above a threshold (e.g., 90% or 95%), the procedure may omit applying any further rules. Or, the procedure may apply all rules regardless of their outputs.

A respective weight may be applied to the output of each rule. For example, weight 820 may be applied to respective probabilities for each known provider 814, weight 822 may be applied to respective probabilities for each known provider 816, and weight 824 may be applied to respective probabilities for each known provider 818. As noted above, the second layer may be trained with a labeled dataset and apply an MLE to determine these weights.

Calculating aggregate score 826 may be performed for each known provider. These aggregate scores may be a sum of the weighted probabilities (e.g., weight 820 applied to respective probabilities for a given provider plus weight 822 applied to respective probabilities for the given provider, and so on). Other aggregation functions can be used.

Predicted provider 828 may be the provider with the highest aggregate score. This provider may be considered to be the most similar or related to provider data 754 and/or description data 756. In some cases, a user may be presented with a list of providers that have the top n highest aggregate scores (where n is 3, 5, 10, etc.), and the user may select a provider from this list.

Once a provider is predicted, the process may move on to the third layer of the multi-layer ML model. FIG. 9 depicts the third layer in operation 900. Third layer 900 takes predicted provider 828 and description data 756 as input. In some embodiments, description data 756 may be the same data used as input to the first layer in operation 750.

Tokenizing 902 may take description data 756 as input and produce tokened output consisting of one or more tokens associated with words and/or n-grams therein. Other processing, adjustment, or edits may be made to description data 756. Again, it is assumed that software catalog 804 has already been tokenized (and/or processed, adjusted, or edited) so that it is in condition to be compared to the output of tokenizing 902.

Since the provider has already been predicted, a subset of the data from software catalog 804 may be used in this layer. In particular, only application titles from the predicted provider may be considered. Thus, in some embodiments, the third layer either predicts an application that is associated with predicted provider 828 or predicts no application title at all. Further, if predicted provider 828 is associated with only one application title, this application title may be selected by default, thus avoiding the application of any of the rules discussed below.

But, if there is more than one application title associated with predicted provider 828, a number of rules may be then applied to this data in rule order 906. These rules are similar to those used in the second layer.

For example, applying application title rule 908 may take the output of tokenizing 902 and at least part of software catalog 804 as input, and produce respective probabilities for each relevant application title 914 as output. Likewise, applying application title rule 910 may take the output of tokenizing 902 and at least part of software catalog 804 as input, and produce respective probabilities for each relevant application title 916 as output. Similarly, applying application title rule 912 may take the output of tokenizing 802 and at least part of software catalog 804 as input, and produce respective probabilities for each relevant application title 918 as output. The dotted line between provider rule 910 and provider rule 912 indicates that rule order 906 may contain any number of rules.

As noted above, rules may be based on exact matches, partial matches, prefix matches, suffix matches, edit distances, or other similarity functions between the tokenized input data and software catalog 804. Other types of rules are possible.

Thus, if there are 100 relevant application titles in software catalog 804, a rule may generate a probability between 0 and 1 inclusive for each of these application titles, where the higher the probability the better the match between the tokenized input data and software catalog 804. For example, if a rule is based on an exact match, it may generate a probability of 1 when it finds an exact match and a probability of 0 in all other cases. On the other hand, if a rule is based on an edit distance, it may generate a probability that is inversely proportional to the determined edit distance.

Rule order 906 may be arranged so that the rules with greater accuracy and/or lower computational requirements may be applied first. If any rule generates a probability above a threshold (e.g., 90% or 95%), the procedure may omit applying any further rules. Or, the procedure may apply all rules regardless of their outputs.

A respective weight may be applied to the output of each rule. For example, weight 920 may be applied to respective probabilities for each relevant application title 914, weight 922 may be applied to respective probabilities for each relevant application title 916, and weight 924 may be applied to respective probabilities for each relevant provider 918. The third layer may be trained with a labeled dataset and apply an MLE to determine these weights.

Calculating aggregate score 926 may be performed for each relevant application title. These aggregate scores may be a sum of the weighted probabilities, e.g., weight 920 applied to respective probabilities for a given application title plus weight 922 applied to respective probabilities for the given application title, and so on. Other aggregation functions can be used.

Predicted application title 928 may be the application title with the highest aggregate score. This application title may be considered to be the most similar or related to description data 756. In some cases, a user may be presented with a list of application titles that have the top n highest aggregate scores (where n is 3, 5, 10, etc.), and the user may select an application title from this list.

VII. EXAMPLE SOFTWARE CLASSIFICATION OPERATIONS

Figure 10:
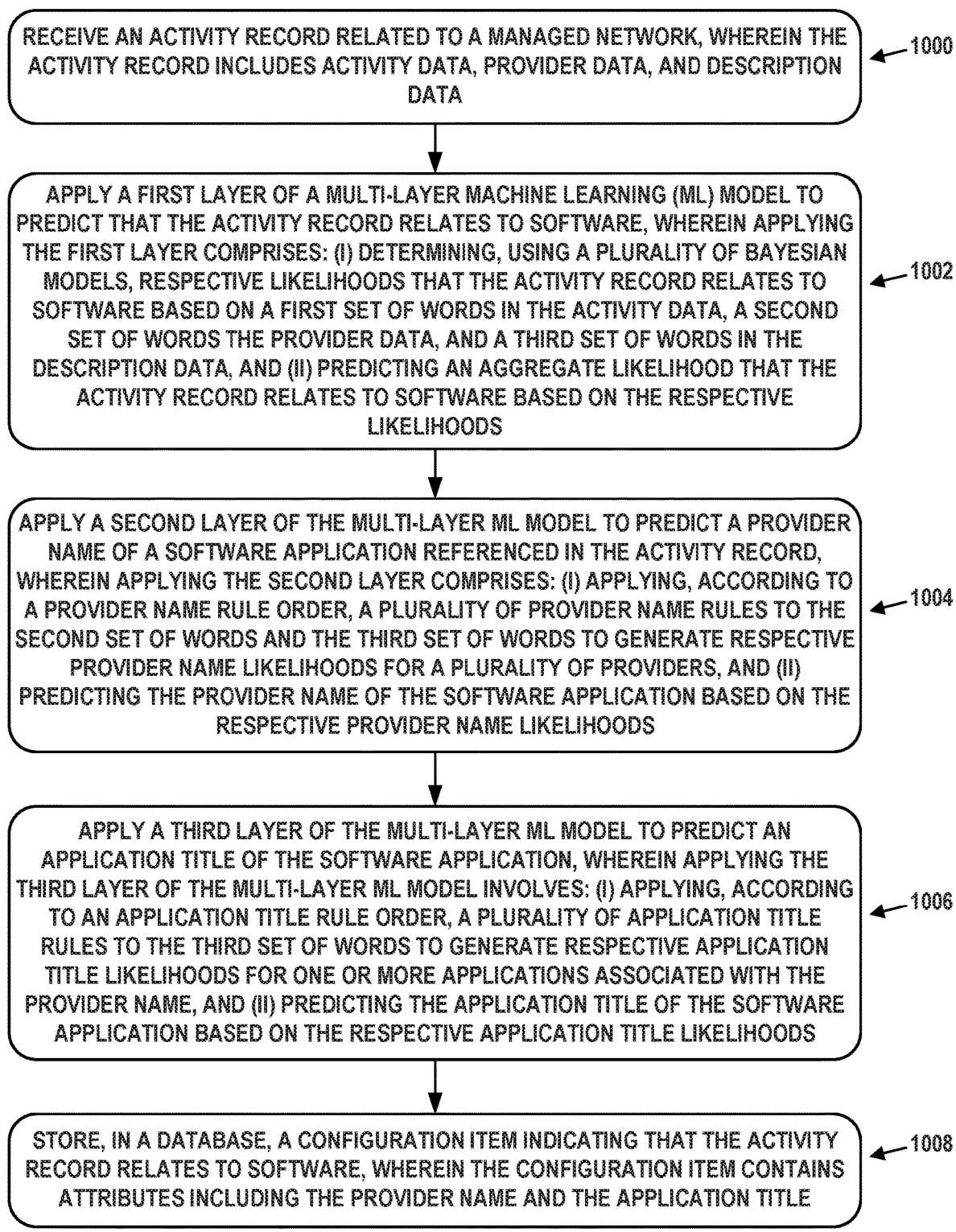
FIG. 10 is a flow chart, in accordance with example embodiments.

FIG. 10 is a flow chart illustrating a process or method according to an example embodiment. The method could relate to a run-time phase of the multi-layer ML model described herein. The method may be carried out by a computing device, such as computing device 100, and/or a cluster of computing devices, such as server cluster 200. However, the method can be carried out by other types of devices or device subsystems. For example, the method could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein. Some or all of the steps or blocks could be similar or identical to the first layer 750, second layer 800, and/or the third layer 900 as illustrated and described in reference to FIGS. 7B, 8, and 9.

Block 1000 may involve receiving an activity record related to a managed network, where the activity record includes activity data, provider data, and description data.

Block 1002 may involve applying a first layer of a multi-layer ML model to predict that the activity record relates to software, where applying the first layer comprises: (i) determining, using a plurality of Bayesian models, respective likelihoods that the activity record relates to software based on a first set of words in the activity data, a second set of words the provider data, and a third set of words in the description data, and (ii) predicting an aggregate likelihood that the activity record relates to software based on the respective likelihoods.

Block 1004 may involve applying a second layer of the multi-layer ML model to predict a provider name of a software application referenced in the activity record, where applying the second layer comprises: (i) applying, according to a provider name rule order, a plurality of provider name rules to the second set of words and the third set of words to generate respective provider name likelihoods for a plurality of providers, and (ii) predicting the provider name of the software application based on the respective provider name likelihoods.

Block 1006 may involve applying a third layer of the multi-layer ML model to predict an application title of the software application, where applying the third layer of the multi-layer ML model involves: (i) applying, according to an application title rule order, a plurality of application title rules to the third set of words to generate respective application title likelihoods for one or more applications associated with the provider name, and (ii) predicting the application title of the software application based on the respective application title likelihoods.

Block 1008 involves storing, in a database, a configuration item indicating that the activity record relates to software, where the configuration item contains attributes including the provider name and the application title.

In some embodiments, each of the plurality of Bayesian models is trained with labeled activity records that each associate: (i) one or more of activity training data, provider training data, and description training data with (ii) an indication of whether the respective activity record is related to software.

In some embodiments, each of the plurality of Bayesian models is trained and applied independently from one another.

In some embodiments, predicting the aggregate likelihood that the activity record relates to software comprises applying a logistic regression model to the respective likelihoods, where the logistic regression model applies respective weights to the respective provider name likelihoods.

In some embodiments, applying the first layer may further involve determining counts of words or phrases that appear in: (i) any of the activity data, the provider data, or the description data, and (ii) a predetermined catalog of words and phrases, where predicting the aggregate likelihood that the activity record relates to software is also based on the counts of the words or phrases. In some embodiments, the predetermined catalog contains software application titles and provider names of providers of the software application titles.

In some embodiments, the predetermined catalog also contains URLs associated with the software application titles or provider names.

In some embodiments, each of the plurality of Bayesian models is associated with a respective threshold, where applying the first layer further comprises comparing the respective likelihoods that the activity record relates to software to their respective thresholds. In some embodiments, applying the first layer further comprises tagging the activity record for manual classification based on a comparison between at least one of the respective likelihoods that the activity record relates to software and its respective threshold being within a predetermined range of one another.

In some embodiments, a predetermined catalog contains a plurality of ground truth provider names, where the plurality of provider name rules include: a first rule that is triggered when the second set of words exactly matches one of the plurality of ground truth provider names, a second rule that is triggered when the second set of words shares a common prefix with one of the plurality of ground truth provider names, a third rule that is triggered when the second set of words is contained within one of the plurality of ground truth provider names, or a fourth rule that is triggered based on an edit distance between the second set of words and one of the plurality of ground truth provider names.

In some embodiments, a predetermined catalog contains a plurality of ground truth application titles, and where the plurality of application title rules include: a first rule that is triggered when the third set of words exactly matches one of the plurality of ground truth application titles, a second rule that is based on the second set of words shares a common prefix with one of the plurality of ground truth application titles, a third rule that is triggered when the third set of words is contained within one of the plurality of ground truth application titles, or a fourth rule that is triggered when an edit distance between the third set of words and one of the plurality of ground truth application titles.

In some embodiments, applying the plurality of application title rules to the third set of words comprises determining that the provider name has exactly one associated application title, and where predicting the application title of the software application comprises predicting the application title to be the exactly one associated application title.

In some embodiments, the provider name rule order arranges the plurality of provider name rules in increasing order of computational complexity. In some embodiments, the application title rule order arranges the plurality of application title rules in increasing order of computational complexity.

In some embodiments, predicting the provider name of the software application comprises applying respective weights to the respective provider name likelihoods, where the respective weights are determined based on training the second layer with a labeled training dataset that associates (i) provider training data and description training data with (ii) respective provider name rules of the plurality of provider name rules.

In some embodiments, predicting the application title of the software application comprises applying respective weights to the respective application title likelihoods, where the respective weights are determined based on training the third layer with a labeled training dataset that associates (i) description training data with (ii) respective application title rules of the plurality of application title rules.

VIII. EXAMPLE SOFTWARE RECONCILIATION TOOLS

The ML-based software classification embodiments described above can be used to determine transactions that are related to software, as well as to identify the provider (publisher) and the application title (product) of the software in these transactions. Such determinations and identifications can be made from various sources, such as invoices, receipts, credit card bills, and so on.

Each of these transactions may be associated with an amount (e.g., in dollars), a cost center within the enterprise, a department within the enterprise, and/or a physical location in which the software was purchased or was deployed. This additional information may be automatically determined from the source of the transaction (e.g., an invoice) or manually entered by a user who is familiar with the transaction. For example, the amount of a transaction and a physical location thereof might be able to be determined automatically from an invoice, while the user entering or scanning the invoice into the system for classification may enter the cost center and department. Each transaction may also be associated with a type, such as accounts payable (e.g., a transaction that was invoiced from a publisher) or expense (e.g., a transaction that was purchased from personal funds of an employee of the enterprise and is thus reimbursable).

Once the transactions are classified (e.g., using the ML-based system above), these classifications may be combined with associated information in a database. Some or all of this data may be displayed by way of a GUI.

The embodiments herein may represent a GUI in various ways. For example, a server device may generate a representation of a GUI using a combination of HTML and JAVASCRIPT®, for example. The JAVASCRIPT® may include client-side side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

To that point, FIG. 11 depicts GUI 1100, which is a visual representation of classified software transactions. GUI 1100 is in the form of a table that contains columns for the date, description, amount, determined publisher, determined product, type, and department associated each transaction. Thus, the columns may represent discrete fields of the transactions. Header row 1102 provides titles for each column. The columns shown are incomplete for purposes of simplicity, and more columns (e.g., cost center and location) may be available for display.

Entry rows 1104, 1106, 1108, 1110, 1112, and 1114 each represent a single software transaction. For example, entry row 1104 represents a purchase of a "Wordwriter annual subscription" for an amount of $46,000, where the publisher has been identified as "Wordwriter, Inc", the product has been identified as "Wordwriter", the purchase was by way of accounts payable, and the department that made the purchase is "Publishing". In another example, entry row 1112 represents purchase of "SocialNet Premium fee" for an amount of $87.00, where the publisher has been identified as "SocialNet", the product has not been identified, the purchase was by way of an expense, and the department that made the purchase is "HR".

Each entry row also is associated with a checkbox to its left. When an entry row's checkbox is checked, actions may be performed on the entry by way of drop-down menu 1116, such as displaying the entry in more detail, editing the entry, or deleting the entry. If the checkbox for header row 1102 is checked, all entry rows may be selected for carrying out common actions on each.

Control 1118 allows the user to configure the number of rows displayed per page of GUI 1100. Control 1118 also allows the user to navigate between these pages.

Search box 1120 allows the user to enter a textual search term. In response, the system may display the table of GUI 1100 but only with entry rows with at least one field containing or matching the term. For example, if user were to enter "chat" in search box 1120, GUI 1100 might display only entry rows 1106 and 1108, due to this search term matching text in the description, publisher, and product columns of these entry rows.

A medium-to-large enterprise may have extensive software purchases, easily reaching hundreds or thousands of transactions per month. As a consequence, tracking the utilization and cost of this software is a cumbersome and expensive problem.

For instance, in a large enough organization, different departments that do not communicate with each other may each purchase enterprise-wide licenses to the same software. Thus, the enterprise is double-licensed for this software and is wasting money on the duplicative licenses.

In another scenario, different departments may make use of different software tools for the same function. Thus, it is possible that three different departments use three different online chat programs. Not only are these three chat programs likely to be incompatible with one another and therefore unable to facilitate cross-department chat sessions, the enterprise may be able to reduce licensing costs by eliminating two of them and having all three departments use just one such program.

In yet another scenario, two enterprises may merge, or one may acquire the other. These enterprises may each have licensed different software solutions for various functions. But eliminating this redundancy and thereby reducing overall software spending can take months or years, as the enterprises may not have accurate inventories of their licensed software.

In order to address these and other issues, software asset management tools have been introduced. A software asset management tool includes facilities that allow an enterprise to track its purchased and/or deployed software, as well as the number of and type of its entitlements thereto. When the enterprise makes use of remote network management platform 320, such tools may store representations of the software and its entitlements in a database of a computational instance therein (e.g., computational instance 322). Thus, by way of a web-based GUI, the enterprise may be able to maintain an inventory of its software assets.

For purposes of this discussion, a particular software package may be represented by a software model that includes the software's publisher, product, version, and edition. In some cases, a software model may contain more or less information, such as just the publisher and product. For example, the software package referred to in entry row 1110 may have a publisher of "ABC Software", a product name of "PhotoEditor", a version of 3.1, and an edition of 1.0.

Also for purposes of this discussion, an entitlement may be a count of licenses, as well as the types of these licenses, that an enterprise has purchased. The license types may be geographically-based (e.g., site-wide or world-wide), per-device, per-processor, per-core, per-user, per-concurrent user, and so on. For example, an enterprise may have purchased entitlements for 5 per-device installations of PhotoEditor. In this case, the enterprise is permitted to install this software package on no more than 5 different computing devices.

Further, software asset management tools can be facilitated by the discovery procedures described in the context of FIG. 5A and FIG. 5B. These procedures may be able to identify software installed on devices in the enterprise (i.e., the enterprise may be represented by managed network 300). Then, the discovered software can be compared to the entitlements in the software asset management database to determine whether the enterprise is under-licensed, over-licensed, or properly licensed.

Nonetheless, discovery procedures may not be able to identify all installed software packages. For example, some client devices (e.g., laptops and mobile devices) may not be on the managed network while discovery is running, which can result in an undercount of installed software. Further, some software packages used by the managed network might not actually be installed on the managed network; instead, it could be installed in network operated by a third-party and/or cloud-based provider.

Ultimately, even with the help of software asset management tools, one cannot manage what one cannot see. Thus, incorporating the software classification embodiments described above and exemplified in FIG. 11 into a software asset management solution can improve the efficacy of the latter.

In particular, software classification based on transactions may identify software that is not managed by the software asset management tool. This unmanaged software may represent additional, redundant, or wasteful spending on the part of the enterprise. Further, GUIs can be produced that allow a user to rapidly identify specific types of additional, redundant, or wasteful spending (e.g., enterprise employees purchasing individual licenses for software that the enterprise has already licensed site-wide) on a cost center, department, or location basis. Moreover, additional GUIs may help users identify categories of software for which enterprise spending is high, or for which the enterprise is licensing multiple different software packages.

A. Graphical User Interfaces for Software Spend Detection

Figure 12A:
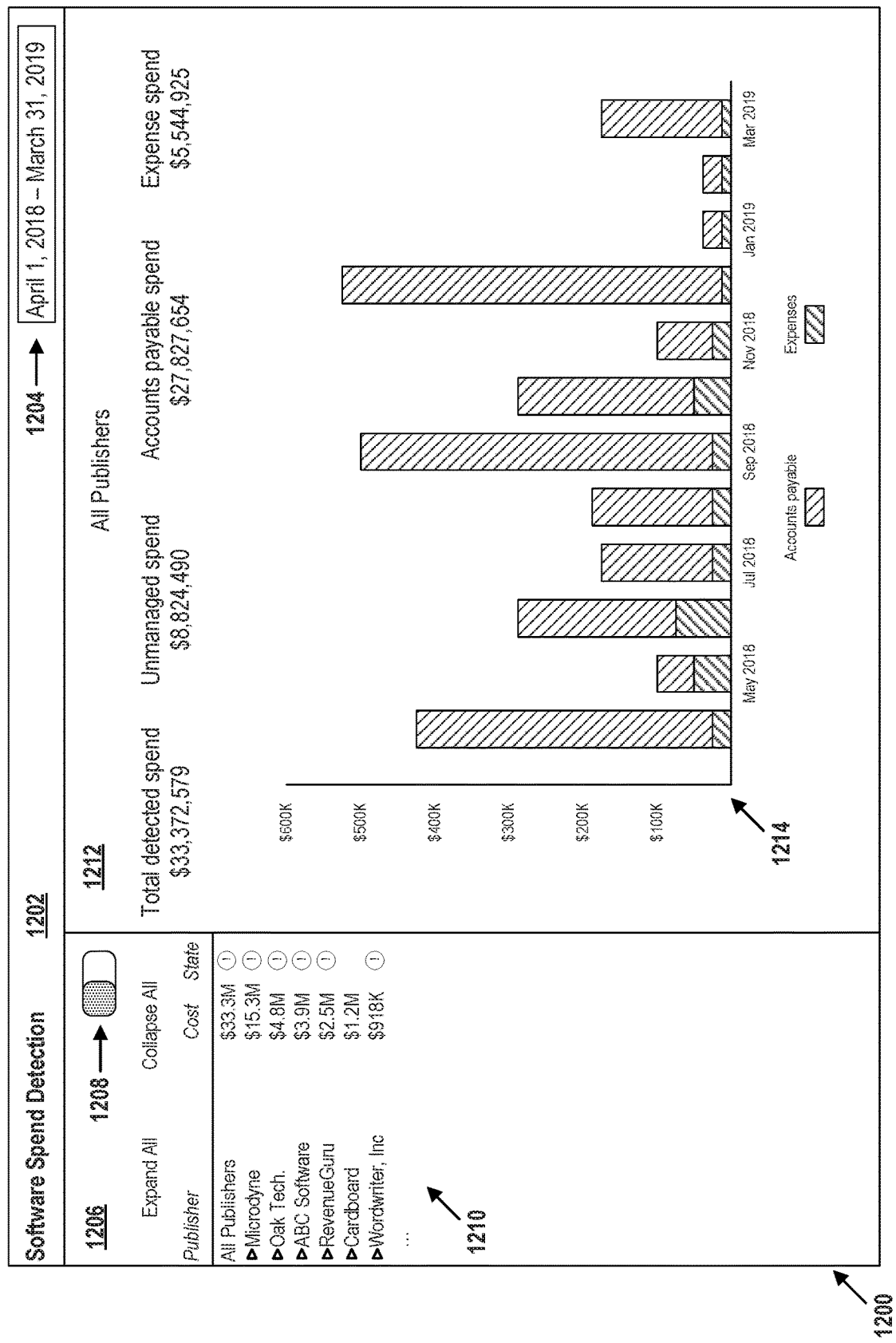
FIGS. 12A, 12B, 12C, 12D, 12E, 12F, and 12G depict graphical user interfaces for facilitating software reconciliation, in accordance with example embodiments.

FIG. 12A depicts GUI 1200 that facilitates software spend detection. In particular, GUI 1200, as well as the other GUIs described herein, allow a user to rapidly determine software spend for both managed and unmanaged software, and drill down to determine the source of this spending. From these GUIs, the user may be able to identify strategies that can reduce spending on over-licensed software and redundant software packages.

Note that the numeric amounts shown in these figures might or might not be consistent per figure or across figures. Instead, the amounts in these figures are for purposes of illustration and any relationships therebetween may be described below.

GUI 1200 includes panes 1202, 1206, and 1212. Pane 1202 is a title bar that includes date range 1204, which is shown with the range of Apr. 1, 2018 to Mar. 31, 2019 selected. Date range 1204 may be user-adjustable to select, for example, ranges that include the last week, last month, last quarter, last year, last two years, last three years, a user-configured range, and so on. Once such a range is selected, GUI 1200 may be updated to include data from this range. For example, if the date range is changed to Apr. 1, 2017 to Mar. 31, 2019, panes 1206 and 1212 may be dynamically updated to reflect data from the newly-specified two-year range.

Figure 12B:
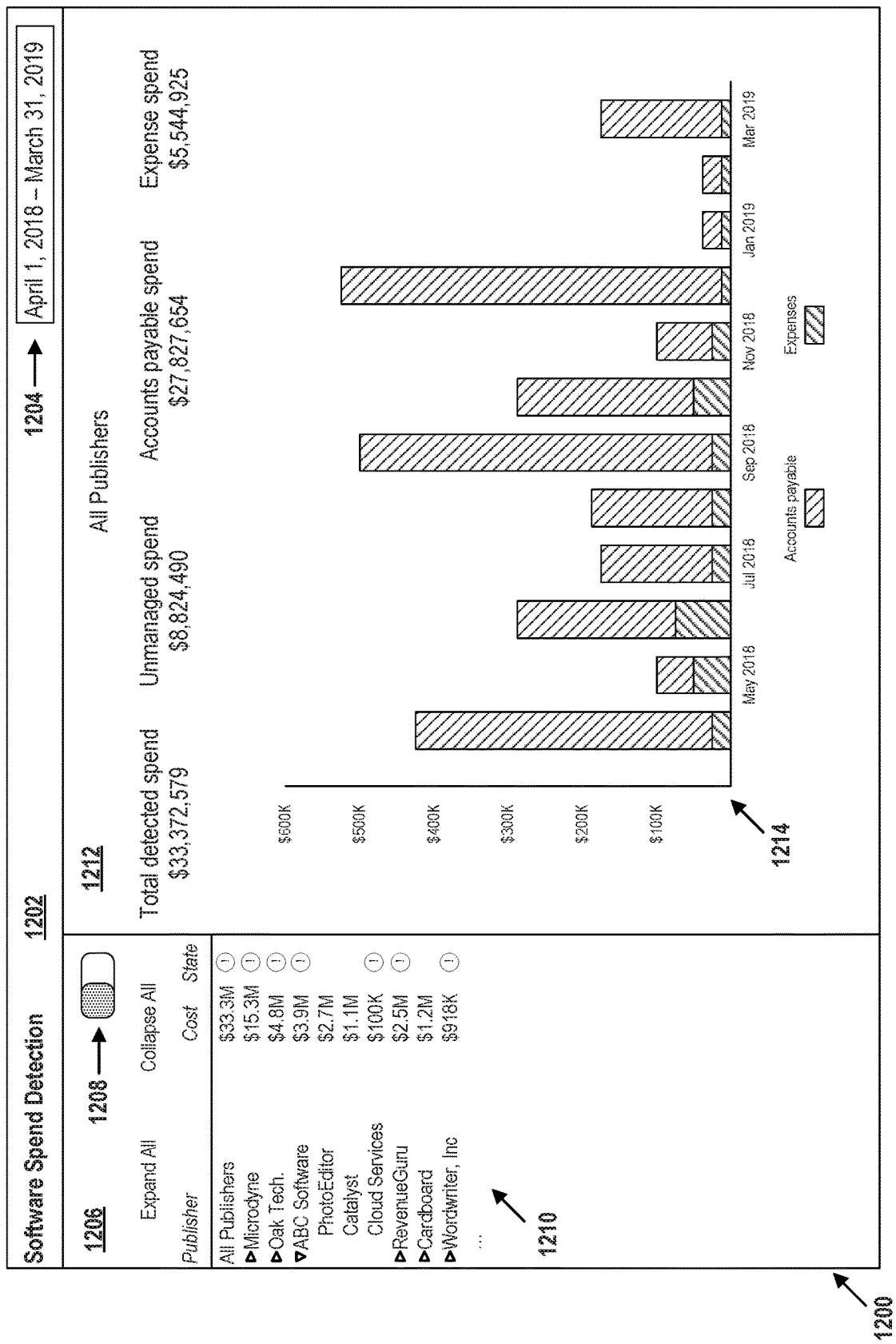
Figure 12C:
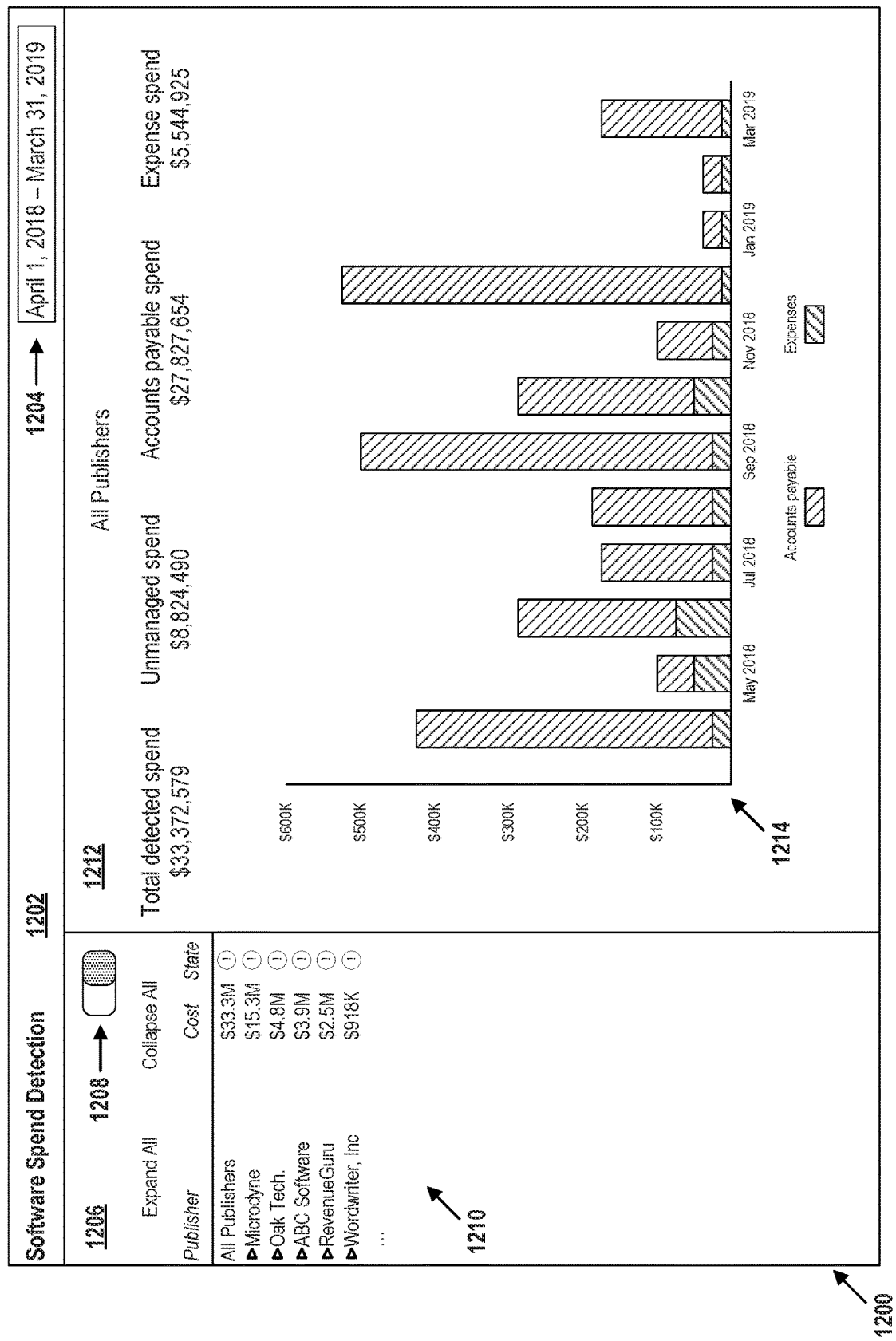

Pane 1206 includes slider 1208 and menu 1210. Slider 1208, which is shown positioned to the left, controls whether all software or only unmanaged software is shown in menu 1210 and/or pane 1212. This functionality will be illustrated in FIG. 12C, below.

Menu 1210 contains an expandable and collapsible list of software packages for which spending was found by the classification procedures described above. Menu 1210 includes a truncated list of publishers, the total detected spending for each, and a state for each. The total detected spending may be the sum of all spending attributable to that publisher across all of its products. The state may indicate whether any of the publisher's spending is attributable to unmanaged software. If so, a circle with an exclamation point therein may be shown in the state column. Notably, in menu 1210, each publisher aside from Cardboard has such an indicator in its state column.

Each publisher may also be associated with a respective drop down arrow disposed to the left of the publisher's name. When activated, this arrow may expand to create a submenu underneath the associated publisher, with the submenu containing a list of products (software packages or services) provided by the publisher. This functionality will be illustrated in FIG. 12B, below.

At the top of the list of publishers in menu 1210 is an entry for "All Publishers". The cost and state columns for this entry respectively indicate the total software spending for all publishers of the classified software packages, and whether any of this spending is attributable to unmanaged software.

Pane 1212 contains chart 1214 of software spending over the time period indicated by date range 1204. The embodiment shown is a stacked bar chart that specifies the spending amounts attributable to accounts payable and expenses. The accounts payable amounts appear above the expense amounts in each bar. Other types of charts or graphs may be possible. Above chart 1214 is a summary of the spending across all publishers. The sum of this spending ($33,372,579) is divided into accounts payable spending ($27,827,654) and expense spending ($5,544,925). Also, the total unmanaged spending ($8,824,490) is shown.

GUI 1200 allows the user to rapidly determine which software packages are not being managed by the software asset management tool, as well as the unmanaged spending amount. This facilitates further investigation into why the unmanaged software is not being managed, as well as whether the amounts spent on these and other software packages are warranted.

As mentioned above, FIG. 12B depicts GUI 1200 with the drop down arrow in menu 1210 associated with ABC Software activated. Responsively, a submenu appears showing that the $3.9 million spent on ABC Software is divided into $2.7 million for PhotoEditor, $1.1 million for Catalyst, and $100,000 for cloud services. Notably, the PhotoEditor and Catalyst software is managed, while the cloud services line item is not managed. This may indicate that one or more individuals or groups may be purchasing and/or licensing cloud services from ABC Software outside of any broader (e.g., enterprise-wide) license agreement between ABC Software and the enterprise. Accordingly, an investigation into these purchases may be made to determine whether the cloud services are actually needed by the enterprise and if so whether they covered by any pre-existing agreement.

Also as mentioned above, FIG. 12C depicts GUI 1200 with slider 1208 positioned to the right. Accordingly, the publishers in menu 1210 are filtered to display only those with at least some unmanaged software. This allows users to rapidly focus their attention on addressing any issues with this unmanaged software.

Figure 12D:
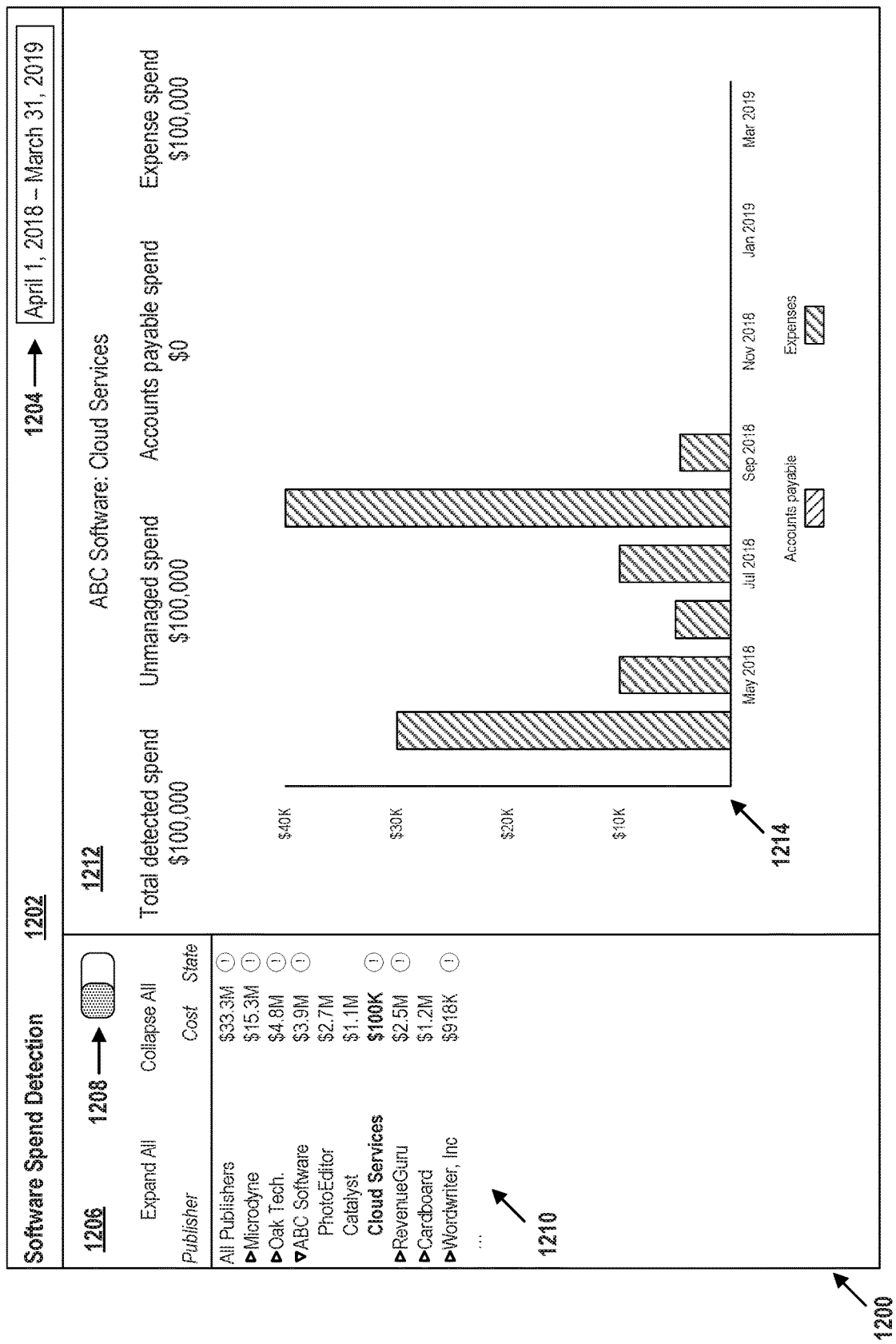

In addition to these features, FIG. 12D depicts GUI 1200 with cloud services selected from menu 1210. For example, the user may click on or otherwise activate this menu entry and pane 1212 may be updated as shown in FIG. 12D.

Notably, the spending amounts at the top of pane 1212 are updated to focus on just the cloud services product from ABC Software. To that point, they indicate that a total of $100,000 was spent on cloud services during the time period indicated by date range 1204. All of this was due to expenses rather than accounts receivable, and all of this is also unmanaged. Chart 1214 may also be updated to show spending over time on the cloud services. The example of FIG. 12D further demonstrates how the data representing classified software transactions can be displayed in order to allow users to easily identify unmanaged software and potential excess spending.

Figure 12E:
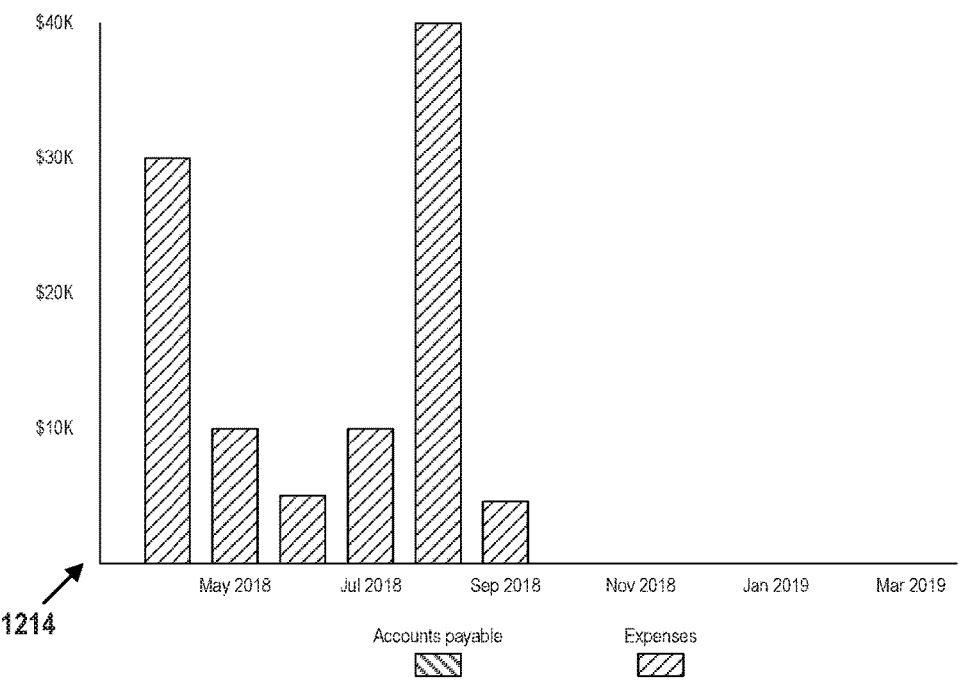
Figure 12F:
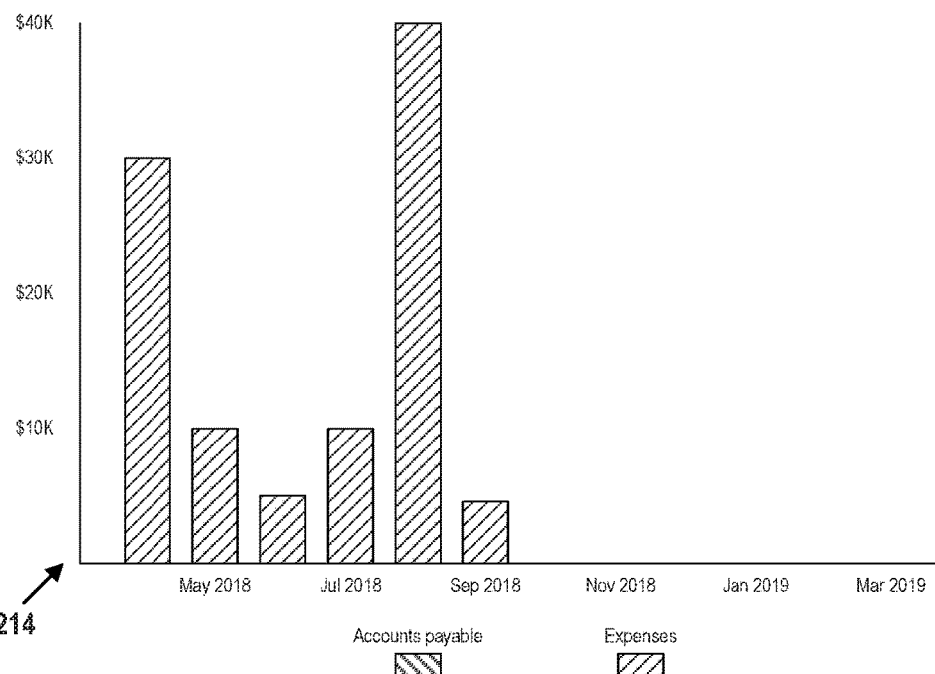
Figure 12G:
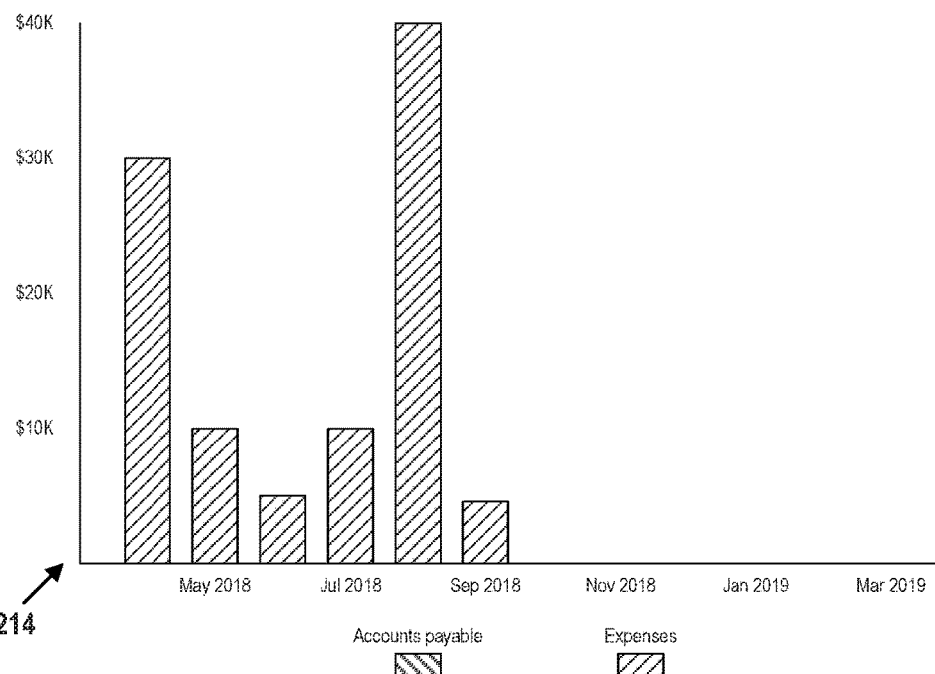

FIGS. 12E, 12F, and 12G depict expanded views of pane 1212 in GUI 1200. In particular, sub-pane 1220 is depicted as appearing below pane 1212. Sub-pane 1220 provides additional detail regarding the software spending shown in chart 1214, including selectable tabs for software transactions, cost centers, department, and location. In some embodiments, exactly one of these tabs can be selected at a time and doing so can cause portions of sub-pane 1220 below the tabs to display further information.

In FIG. 12E, the cost centers tab is shown as selected. Accordingly, the spending depicted in chart 1214 is broken out by cost center in sub-pane 1220. In enterprises, cost centers may be logical groupings of expenditures. Each cost center is represented by a drop down arrow with individual software transactions belonging to the cost centers displayed below the respective arrows. For instance, two software transactions were made using the Product UX cost center. The date, description, amount (cost), publisher, product, and type are shown for each. Notably, even though all of the publishers and products are the same for the software transactions, the descriptions are different for some. This reflects that the transaction classifier may be flexible enough to correctly assign various descriptions of software to the proper publisher and product.

In FIG. 12F, the department tab is shown as selected. Accordingly, the spending depicted in chart 1214 is broken out by department in sub-pane 1220. In enterprises, departments may be groupings of individuals based on their job descriptions. Each department is represented by a drop down arrow with individual software transactions belonging to that department displayed below its respective arrow. For instance, three software transactions were made by the R&D cost center. The date, description, amount, publisher, product, and type are shown for each.

In FIG. 12G, the location tab is shown as selected. Accordingly, the spending depicted in chart 1214 is broken out by location in sub-pane 1220. Enterprises may have offices in various physical locations throughout a city, country, or the world. Each location is represented by a drop down arrow with individual software transactions belonging to that location displayed below its respective arrow. For instance, five software transactions were made by in the enterprise's Chicago office. The date, description, amount, publisher, product, and type are shown for each.

A GUI displaying the software transactions tab being selected is not explicitly shown in the figures. But such a GUI may depict output similar to that of FIGS. 12E, 12F, and 12G, but containing the software transaction content of FIG. 11, for example.

B. Graphical User Interfaces for Software Overlap Detection

Once software spending has been classified in terms of publisher and product, the software may be further classified into a category. These categories may be predefined, and each publisher/product pair may be associated with one such category. Example categories include relational databases, HR management, CRM, team collaboration, video conferencing, and so on.

The embodiments herein facilitate identifying overlapping software within these categories. For example, an enterprise may unknowingly use multiple team collaboration software packages, paying licensing or subscription fees for each, when enterprise-wide use of only one such package would meet the enterprise's need and save money. In particular, there are ways to identify overlapping software packages that could potentially be consolidated—by examining the amount spent on the packages per category and the number of packages per category.

Figure 13A:
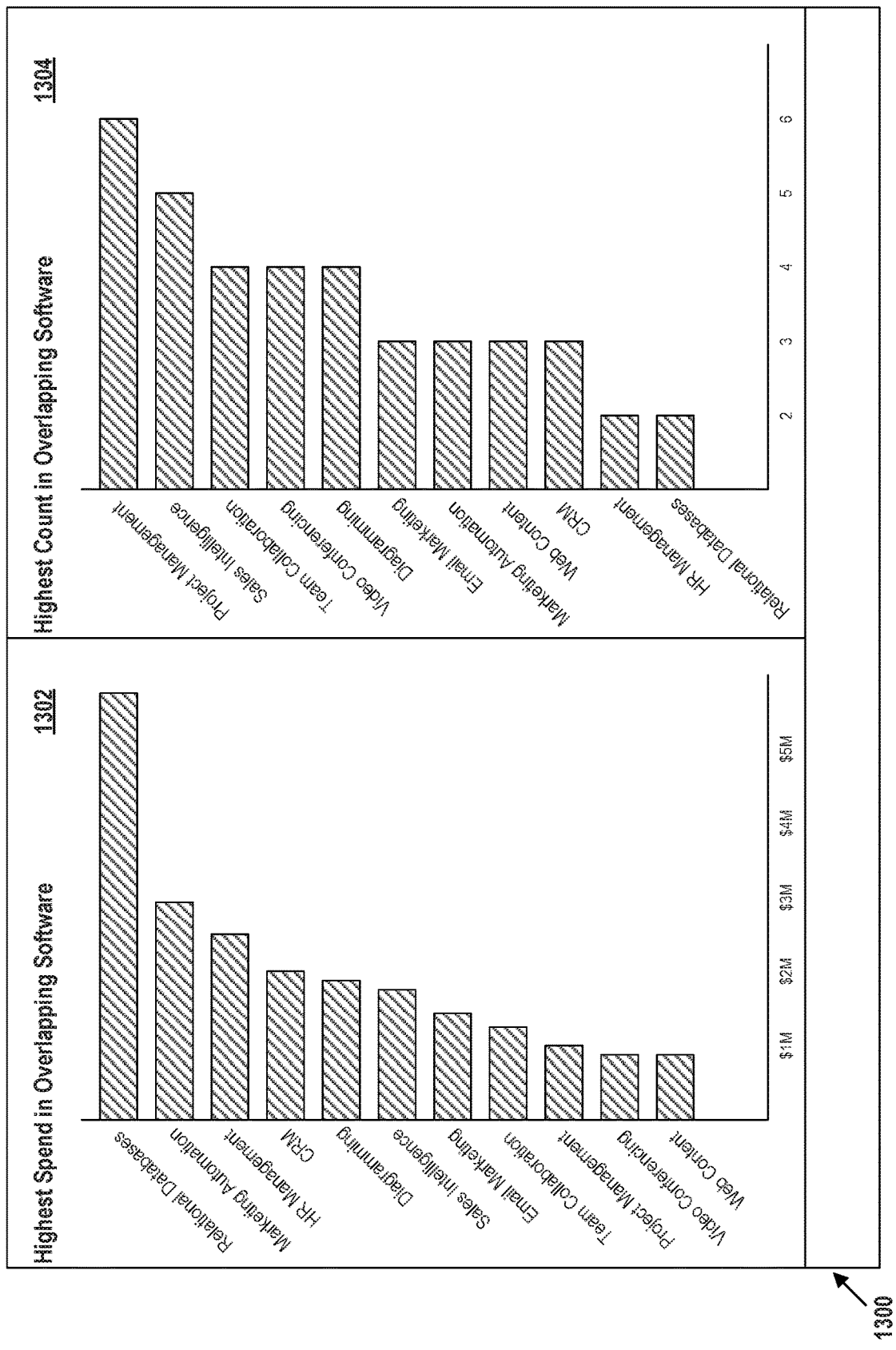
FIGS. 13A and 13B depict graphical user interfaces for facilitating software redundancy determination, in accordance with example embodiments.

FIG. 13A depicts GUI 1300 containing charts for each of these methods. Pane 1302 ranks spending per category of software from highest to lowest amount in a chart. Although a horizontal bar chart is displayed in pane 1302, other types of charts or graphs may be possible. For instance, $5.7 million was spent on relational databases, while $1 million was spent on project management. Thus, just considering the information in pane 1302, it would appear that consolidating the number of relational database software packages used by the enterprise could be more beneficial than consolidating the number of project management software packages.

On the other hand, pane 1304 ranks the number of software packages per category from greatest to least in another chart. Although a horizontal bar chart is displayed in pane 1304, other types of charts or graphs may be possible. Particularly, this pane shows that the enterprise has purchased, licensed, or subscribed to six different project management software packages and two different relational database software packages. As a consequence, it may be beneficial for the enterprise to consolidate the number of project management software packages down to one or two so that: (i) most or all departments in the enterprise can more easily collaborate, and cost is reduced. Nonetheless, it also may be beneficial for the enterprise to consolidate the number of relational database packages from two to one because this may represent a significant savings.

Figure 13B:
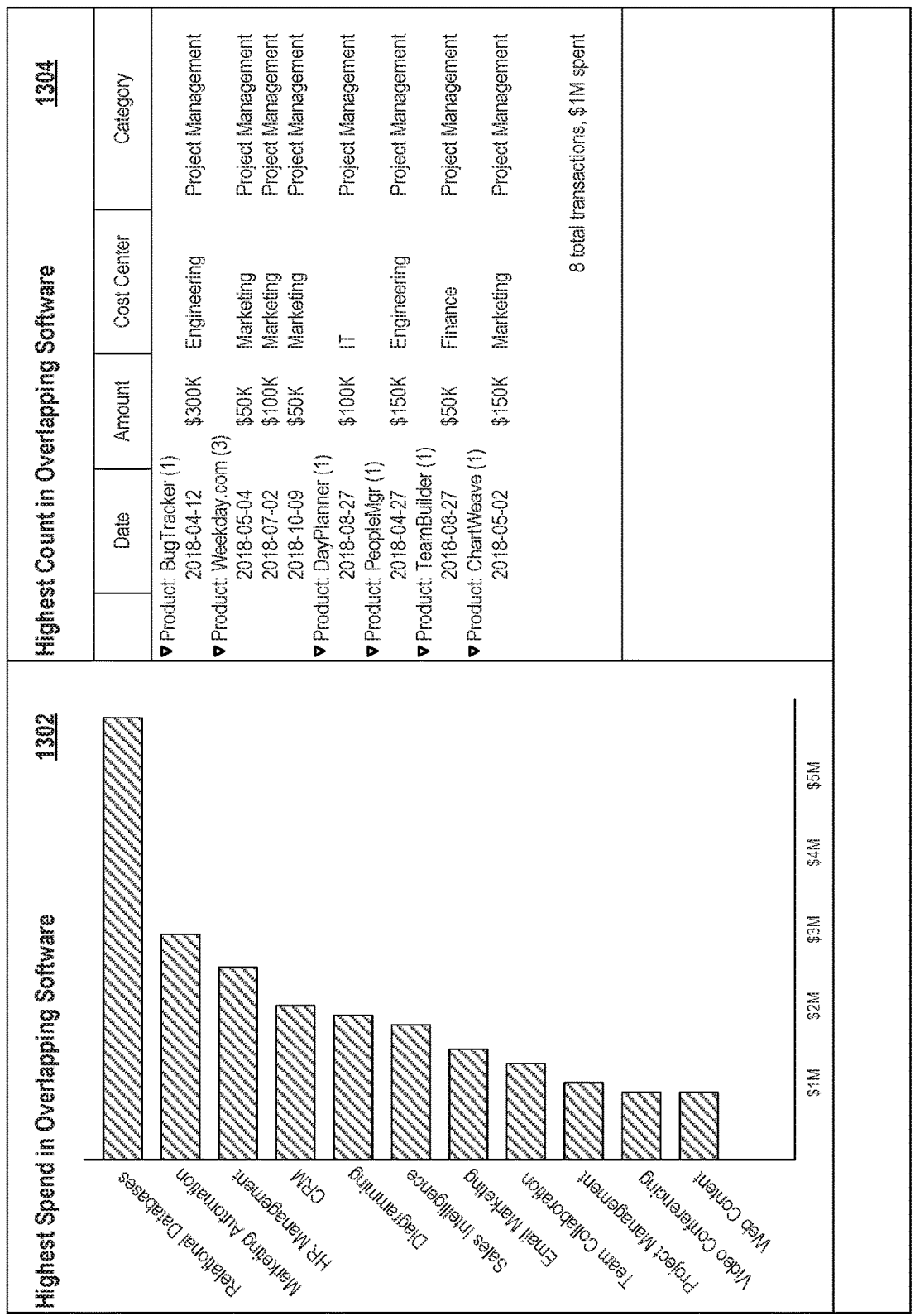

Each bar in these charts, or the labels thereof, may be links that, when activated, change GUI 1300 to display detailed information about the associated category. As an example, FIG. 13B depicts the result of activating the project management bar in pane 1304. The chart is replaced by a table that breaks down spending by each of the six project management software packages. Notably, for each package (BugTracker, Weekday.com, DayPlanner, PeopleMgr, TeamBuilder, ChartWeave), the transactions representing spending thereon are listed. Further, the drop down arrows to the left of each the packages listed respectively control whether the transactions attributable to these packages are shown. In FIG. 13B, all transactions are shown, but if the user activates one or more of the drop down arrows, the associated transaction can be hidden.

A similar per-transaction breakdown may be displayable by activating links associated with the bars in pane 1302. Additionally, a complete list of software categories, each expandable to display the software packages therein, may appear below panes 1302 and 1304.

Advantageously, GUI 1300 allows the user to rapidly determine software packages that are potentially redundant and the cost savings associated with consolidating such packages. In many medium and large enterprises, these redundancies may not be known or discoverable without the embodiments herein. For instance, in a scenario in which two large enterprises merge, these enterprises may each use different software packages many purposes. In the past, it could take years to identify all redundant software packages between the two enterprises. But with the embodiments herein, these redundancies can be identified in days or weeks instead.

IX. EXAMPLE SOFTWARE REDUNDANCY OPERATIONS

Figure 14:
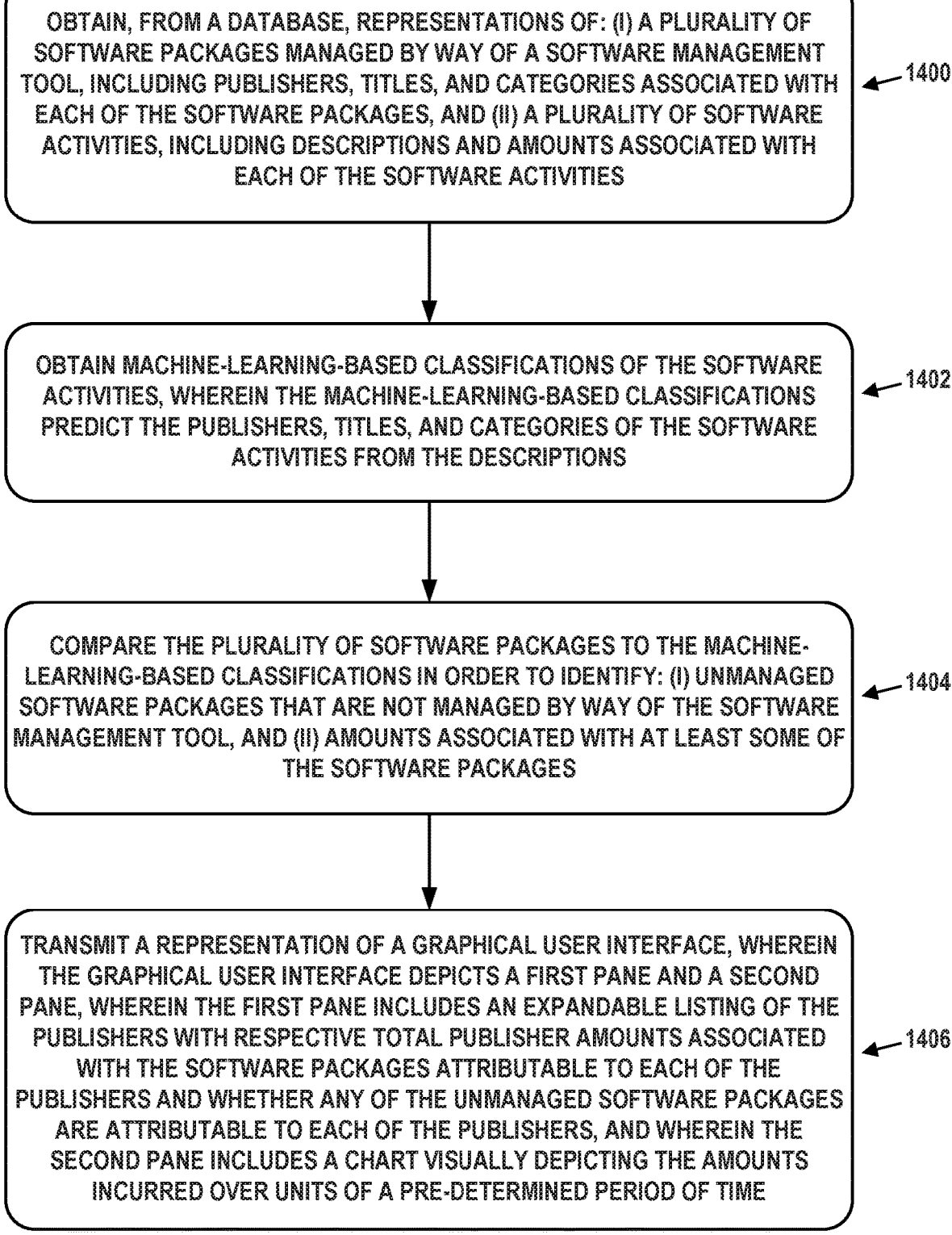
FIG. 14 is a flow chart, in accordance with example embodiments.

FIG. 14 is a flow chart illustrating a process or method according to an example embodiment. The method could relate to a run-time phase of the multi-layer ML model described herein. The method may be carried out by a computing device, such as computing device 100, and/or a cluster of computing devices, such as server cluster 200. However, the method can be carried out by other types of devices or device subsystems. For example, the method could be carried out by a portable computer, such as a laptop or a tablet device.

The embodiments of FIG. 14 may be simplified by the removal of any one or more of the features shown therein. Further, these embodiments may be combined with features, aspects, and/or implementations of any of the previous figures or otherwise described herein.

Block 1400 may involve obtaining, by a server device and from a database, representations of: (i) a plurality of software packages managed by way of a software management tool, including publishers, titles, and categories associated with each of the software packages, and (ii) a plurality of software activities (e.g., transactions), including descriptions and amounts associated with each of the software activities.

Block 1402 may involve obtaining, by the server device, machine-learning-based classifications of the software activities, where the machine-learning-based classifications predict the publishers, titles, and categories of the software activities from the descriptions.

Block 1404 may involve comparing, by the server device, the plurality of software packages to the machine-learning-based classifications in order to identify: (i) unmanaged software packages that are not managed by way of the software management tool, and (ii) amounts associated with at least some of the software packages; and Block 1406 may involve transmitting, by the server device and to a client device, a representation of a graphical user interface, where the graphical user interface depicts a first pane and a second pane, where the first pane includes an expandable listing of the publishers with respective total publisher amounts associated with the software packages attributable to each of the publishers and whether any of the unmanaged software packages are attributable to each of the publishers, and where the second pane includes a chart visually depicting the amounts incurred over units of a pre-determined period of time.

In some embodiments, the expandable listing of the publishers allows each particular publisher therein to be expanded to display the software packages attributable to the particular publisher, respective amounts associated with the software packages attributable to the particular publisher, and whether each of the software packages attributable to the particular publisher is unmanaged.

In some embodiments, the first pane also includes a slider or button that, when activated, causes the expandable listing of the publishers to be filtered so that it lists only publishers with at least one of the unmanaged software packages.

In some embodiments, the chart visually depicting the amounts incurred over units of the pre-determined period of time displays the amounts per-month in a bar-chart form.

In some embodiments, the software activities are software transactions and the amounts are costs associated with the software transactions.

In some embodiments, the expandable listing of the publishers allows each particular publisher therein to be selected, and where selection of the particular publisher causes the chart visually depicting the amounts incurred over units of the pre-determined period of time to only represent amounts associated with the particular publisher.

In some embodiments, the second pane includes a tabbed interface with a first tab for cost centers, a second tab for departments, and a third tab for locations, where activating the first tab displays the software activities per associated cost center, where activating the second tab displays the software activities per associated department, and where activating the third tab displays the software activities per associated location.

In some embodiments, the operations also involve: (i) determining, for the categories, total category amounts, where the total category amounts are sums of the amounts associated with the software packages in each of the categories, (ii) determining, for the categories, total package counts, where the total package counts are numbers of the software packages in each of the categories, and (iii) transmitting, to the client device, an updated representation of an updated version of the graphical user interface that depicts a third pane and a fourth pane, where the third pane includes a second chart that visually depicts a first ranking of the total category amounts and their associated categories in decreasing order, and where the fourth pane includes a third chart that visually depicts a second ranking of the total package counts and their associated categories in decreasing order.

In some embodiments, the total category amounts displayed in the second chart are selectable to further display a first listing of transactions per software package of the associated category, and where the total package counts displayed in the second chart are selectable to further display a second listing of transactions per software package of the associated category.

In some embodiments, the amounts are individually represented based on whether they were derived from accounts payable transactions or expense transactions.

X. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   a database comprising respective representations of: (i) a plurality of software packages that are managed by way of a software management tool and associated with a managed network, wherein the respective representations of the plurality of software packages include respective publishers, respective titles, and respective categories associated with each of the plurality of software packages, and (ii) a plurality of activities associated with the managed network, wherein the respective representations of the plurality of activities include respective descriptions and respective amounts associated with each of the plurality of activities; and
   a server device configured to:
      receive the respective representations of the plurality of activities;
      determine, via one or more machine-learning classifiers, that one or more activities of the plurality of activities are associated with one or more respective additional software packages;
      determine, via the one or more machine-learning classifiers, respective machine-learning-based classifications of the one or more activities based on the respective descriptions of the one or more activities, wherein the respective machine-learning-based classifications are indicative of respective additional publishers, respective additional titles, and respective additional categories associated with the one or more respective additional software packages;
      compare the respective representations of the plurality of software packages to the respective machine-learning-based classifications of the one or more activities in order to identify: (i) one or more unmanaged software packages of the one or more respective additional software packages, wherein the one or more unmanaged software packages are not managed by way of the software management tool, and (ii) respective additional amounts associated with the one or more unmanaged software packages; and
      transmit, to a client device, a representation of a graphical user interface, wherein the graphical user interface depicts a first pane and a second pane, wherein the first pane includes (i) an expandable listing of the respective publishers and the respective additional publishers with respective total publisher amounts associated with the plurality of software packages, or the one or more unmanaged software packages, or both, attributable to each publisher of the respective publishers and the respective additional publishers, and (ii) respective indications of the one or more unmanaged software packages that are attributable to the respective publishers and the respective additional publishers, and wherein the second pane includes a graphical representation of a chart visually depicting the respective amounts and the respective additional amounts incurred over units of a pre-determined period of time.

2. The system of claim 1, wherein the expandable listing of the respective publishers and the respective additional publishers allows each particular publisher therein to be expanded to display one or more software packages of the plurality of software packages, or the one or more unmanaged software packages, or both, attributable to the particular publisher, the respective amounts or the respective additional amounts associated with the one or more software packages attributable to the particular publisher, and whether each of the one or more software packages attributable to the particular publisher is unmanaged.

3. The system of claim 1, wherein the first pane includes a slider or a button that, when activated, causes the expandable listing of the respective publishers and the respective additional publishers to be filtered such that the expandable listing includes only the respective additional publishers associated with at least one of the one or more unmanaged software packages.

4. The system of claim 1, wherein the chart visually depicting the respective amounts and the respective additional amounts incurred over units of the pre-determined period of time displays the respective amounts per-month and the respective additional amounts per-month in a bar-chart form.

5. The system of claim 4, wherein the respective amounts and the respective additional amounts are individually represented based on whether they were derived from one or more accounts payable transactions or one or more expense transactions.

6. The system of claim 1, wherein the expandable listing of the respective publishers and the respective additional publishers allows each particular publisher therein to be selected, and wherein selection of the particular publisher is configured to cause the chart to visually depict the respective amounts and the respective additional amounts incurred over units of the pre-determined period of time to only depict the respective amounts, or the respective additional amounts, or both, associated with the particular publisher.

7. The system of claim 1, wherein the second pane includes a tabbed interface with a first tab for cost centers, a second tab for departments, and a third tab for locations, wherein activating the first tab displays activities per associated cost center, wherein activating the second tab displays activities per associated department, and wherein activating the third tab displays activities per associated location.

8. The system of claim 1, wherein the server device is configured to:
  determine respective total category amounts for the respective categories, or the respective additional categories, or both, wherein the respective total category amounts are respective sums of the respective amounts associated with each of the plurality of software packages in each of the respective categories, or the respective additional amounts associated with each of the one or more unmanaged software packages in each of the respective additional categories, or both;
  determine respective total package counts for the respective categories, or the respective additional categories, or both, wherein the respective total package counts are respective numbers associated with each of the plurality of software packages in each of the categories, or the respective additional amounts associated with each of the one or more unmanaged software packages in each of the respective additional categories, or both; and
  transmit, to the client device, an updated representation of the graphical user interface that depicts a third pane and a fourth pane, wherein the third pane includes a second chart that visually depicts a first ranking of the respective total category amounts and the respective categories, or the respective additional categories, or both, in decreasing order, and wherein the fourth pane includes a third chart that visually depicts a second ranking of the respective total package counts and the respective categories, or the respective additional categories, or both, in decreasing order.

9. The system of claim 8, wherein each respective total category amount of the respective total category amounts displayed in the second chart is selectable to display a first listing of transactions per software package of a first category of the respective categories or the respective additional categories associated with the respective total category amount, and wherein each total package count of the respective total package counts displayed in the third chart is selectable to display a second listing of transactions per software package of a second category of the respective categories or the respective additional categories associated with the respective total category amount.

10. A computer-implemented method comprising:
  receiving, by a server device and from a database, respective representations of: (i) a plurality of software packages that are managed by way of a software management tool and associated with a managed network, wherein the respective representations of the plurality of software packages include respective publishers, respective titles, and respective categories associated with each of the plurality of software packages, and (ii) a plurality of activities associated with the managed network, wherein the respective representations of the plurality of activities include respective descriptions and respective amounts associated with each of the plurality of activities;
  determining, by the server device via one or more machine-learning classifiers, that one or more activities of the plurality of activities are associated with one or more respective additional software packages;
  determining, by the server device via the one or more machine-learning classifiers, respective machine-learning-based classifications of the one or more activities based on the respective descriptions of the one or more activities, wherein the respective machine-learning-based classifications are indicative of respective additional publishers, respective additional titles, and respective additional categories associated with the one or more respective additional software packages;
  comparing, by the server device, the respective representations of the plurality of software packages to the respective machine-learning-based classifications of the one or more activities in order to identify: (i) one or more unmanaged software packages of the one or more respective additional software packages, wherein the one or more unmanaged software packages are not managed by way of the software management tool, and (ii) respective additional amounts associated with the one or more unmanaged software packages; and
  transmitting, by the server device and to a client device, a representation of a graphical user interface, wherein the graphical user interface depicts a first pane and a second pane, wherein the first pane includes (i) an expandable listing of the respective publishers and the respective additional publishers with respective total publisher amounts associated with the plurality of software packages, or the one or more unmanaged software packages, or both, attributable to each publisher of the respective publishers and the respective additional publishers, and (ii) respective indications of the one or more unmanaged software packages that are attributable to the respective publishers and the respective additional publishers, and wherein the second pane includes a graphical representation of a chart visually depicting the respective amounts and the respective additional amounts incurred over units of a pre-determined period of time.

11. The computer-implemented method of claim 10, wherein the expandable listing of the respective publishers and the respective additional publishers allows each particular publisher therein to be expanded to display one or more software packages of the plurality of software packages, or the one or more unmanaged software packages, or both, attributable to the particular publisher, the respective amounts or the respective additional amounts associated with the one or more software packages attributable to the particular publisher, and whether each of the one or more software packages attributable to the particular publisher is unmanaged.

12. The computer-implemented method of claim 10, wherein the first pane includes a slider or a button that, when activated, causes the expandable listing of the respective publishers and the respective additional publishers to be filtered such that the expandable listing includes only the respective additional publishers associated with at least one of the one or more unmanaged software packages.

13. The computer-implemented method of claim 10, wherein the chart visually depicting the respective amounts and the respective additional amounts incurred over units of the pre-determined period of time displays respective amounts per-month and the respective additional amounts per-month in a bar-chart form.

14. The computer-implemented method of claim 10, wherein the plurality of activities comprise one or more transactions associated with software and the respective amounts are respective costs associated with the one or more transactions.

15. The computer-implemented method of claim 10, wherein the expandable listing of the respective publishers and the respective additional publishers allows each particular publisher therein to be selected, and wherein selection of the particular publisher is configured to cause the chart to visually depict the respective amounts and the respective additional amounts incurred over units of the pre-determined period of time to only depict the respective amounts, or the respective additional amounts, or both, associated with the particular publisher.

16. The computer-implemented method of claim 10, wherein the second pane includes a tabbed interface with a first tab for cost centers, a second tab for departments, and a third tab for locations, wherein activating the first tab displays activities per associated cost center, wherein activating the second tab displays activities per associated department, and wherein activating the third tab displays activities per associated location.

17. The computer-implemented method of claim 10, comprising:
determining respective total category amounts for the respective categories, or the respective additional categories, or both, wherein the respective total category amounts are respective sums of the respective amounts associated with each of the plurality of software packages in each of the categories, or the respective additional amounts associated with each of the one or more unmanaged software packages in each of the respective additional categories, or both;
determining respective total package counts for the respective categories, or the respective additional categories, or both, wherein the respective total package counts are respective numbers associated with each of the plurality of software packages in each of the categories, or the respective additional amounts associated with each of the one or more unmanaged software packages in each of the respective additional categories, or both; and
transmitting, to the client device, an updated representation of the graphical user interface that depicts a third pane and a fourth pane, wherein the third pane includes a second chart that visually depicts a first ranking of the respective total category amounts and the respective categories, or the respective additional categories, or both, in decreasing order, and wherein the fourth pane includes a third chart that visually depicts a second ranking of the respective total package counts and the respective categories, or the respective additional categories, or both, in decreasing order.

18. The computer-implemented method of claim 17, wherein each respective total category amount of the respective total category amounts displayed in the second chart is selectable to display a first listing of transactions per software package of a first category of the respective categories or the respective additional categories associated with the respective total category amount, and wherein each total package count of the respective total package counts displayed in the third chart is selectable to display a second listing of transactions per software package of a second category of the respective categories or the respective additional categories associated with the respective total category amount.

19. An article of manufacture including a non-transitory computer-readable medium, having stored thereon program instructions that, upon execution by a server device, cause the server device to perform operations comprising:
receiving, from a database, respective representations of: (i) a plurality of software packages that are managed by way of a software management tool and associated with a managed network, wherein the respective representations of the plurality of software packages include respective publishers, respective titles, and respective categories associated with each of the plurality of software packages, and (ii) a plurality of activities associated with the managed network, wherein the respective representations of the plurality of activities include respective descriptions and respective amounts associated with each of the plurality of activities;
determining, via one or more machine-learning classifiers, that one or more activities of the plurality of activities are associated with one or more respective additional software packages;
determining, via the one or more machine-learning classifiers, respective machine-learning-based classifications of the one or more activities based on the respective descriptions of the one or more activities, wherein the respective machine-learning-based classifications are indicative of respective additional publishers, respective additional titles, and respective additional categories associated with the one or more respective additional software packages;
comparing the respective representations of the plurality of software packages to the respective machine-learning-based classifications of the one or more activities in order to identify: (i) one or more unmanaged software packages of the one or more respective additional software packages, wherein the one or more unmanaged software packages are not managed by way of the software management tool, and (ii) respective additional amounts associated with the one or more unmanaged software packages; and
transmitting, to a client device, a representation of a graphical user interface, wherein the graphical user interface depicts a first pane and a second pane, wherein the first pane includes (i) an expandable listing of the respective publishers and the respective additional publishers with respective total publisher amounts associated with the plurality of software packages, or the one or more unmanaged software packages, or both, attributable to each publisher of the respective publishers and the respective additional publishers, and (ii) respective indications of the one or more unmanaged software packages that are attributable to the respective publishers and the respective additional publishers, and wherein the second pane includes a graphical representation of a chart visually depicting the respective amounts and the respective additional amounts incurred over units of a pre-determined period of time.

20. The system of claim 1, wherein the one or more machine-learning classifiers are trained based on a data set associated with respective records of an additional plurality of activities different than the plurality of activities.

* * * * *